(12) United States Patent
Mansfield et al.

(10) Patent No.: US 7,697,726 B2
(45) Date of Patent: Apr. 13, 2010

(54) INTERFEROMETER SYSTEM FOR AND A METHOD OF DETERMINING A SURFACE CHARACTERISTIC BY MODIFYING SURFACE HEIGHT DATA USING CORRESPONDING AMPLITUDE DATA

(75) Inventors: Daniel Ian Mansfield, Leicester (GB); Andrew Douglas Bankhead, Leicester (GB)

(73) Assignee: Taylor Hobson Limited, Leicester (GB)

( * ) Notice: Subject to any disclaimer, the term of this patent is extended or adjusted under 35 U.S.C. 154(b) by 1011 days.

(21) Appl. No.: 11/260,072

(22) Filed: Oct. 26, 2005

(65) Prior Publication Data
US 2006/0176522 A1 Aug. 10, 2006

(30) Foreign Application Priority Data
Feb. 9, 2005 (GB) ................... 0502677.8

(51) Int. Cl.
*G06K 9/00* (2006.01)
(52) U.S. Cl. ..................... 382/108
(58) Field of Classification Search ........... 382/141, 382/144–152; 702/167; 356/504, 630, 512, 356/511, 497, 450, 479, 496, 516
See application file for complete search history.

(56) References Cited

U.S. PATENT DOCUMENTS

| | | | |
|---|---|---|---|
| 4,734,803 A | 3/1988 | Nishihira | |
| 4,818,110 A | 4/1989 | Davidson | |
| 5,557,399 A | 9/1996 | de Groot | |
| 5,751,427 A | 5/1998 | de Groot | |
| 5,898,106 A | 4/1999 | Babcock et al. | |
| 5,953,125 A | 9/1999 | de Groot | |
| 6,459,489 B1 | 10/2002 | Farrell et al. | |
| 6,536,265 B1 | 3/2003 | Hanchi et al. | |
| 6,654,190 B2 | 11/2003 | Nath et al. | |
| 6,775,006 B2 | 8/2004 | Groot et al. | |

(Continued)

FOREIGN PATENT DOCUMENTS

EP 0 244 781 A2 11/1987

(Continued)

OTHER PUBLICATIONS

GB Search Report for GB 0602551.4; Dated: May 2, 2006.

(Continued)

*Primary Examiner*—Samir A. Ahmed
*Assistant Examiner*—Atiba O Fitzpatrick
(74) *Attorney, Agent, or Firm*—RatnerPrestia

(57) ABSTRACT

An interferometer system (2) directs light along a sample path (SP) towards a sample surface (7) and along a reference path (RP) towards a reference surface (6). Light reflected by a sample surface region and by the reference surface interfere. Sensing elements (SE) sense interference fringes at intervals along a scan path to provide a set of intensity data. A coherence peak position determiner (201) determines from the intensity data set a position on the scan path that corresponds to the height of the surface region. An amplitude determiner (202) determines amplitude data representing the amplitude of the intensity data at the determined height position. A modified surface height calculator (207) calculates modified height data by modifying the height data by a correction factor determined using the corresponding amplitude data and a correction parameter provided by a correction parameter provider (260).

22 Claims, 22 Drawing Sheets

U.S. PATENT DOCUMENTS

| | | | |
|---|---|---|---|
| 6,847,460 | B2 | 1/2005 | Farrell et al. |
| 2003/0234938 | A1 | 12/2003 | Ge |
| 2009/0002775 | A1 | 1/2009 | Chen et al. |

FOREIGN PATENT DOCUMENTS

| | | |
|---|---|---|
| EP | 0 244 781 B1 | 8/1992 |
| WO | WO-03/078925 A2 | 2/2003 |
| WO | WO-2004/079294 A2 | 9/2004 |

OTHER PUBLICATIONS

K. H. Womack et al., "IEEE Transactions on Magnetics," vol. 34, No. 2, Mar. 1998, p. 459-461.

Byron S. Lee et al., "Profilometry with a coherence scanning microscope," *Applied Optics*, vol. 29, No. 26, Sep. 10, 1990, pp. 3784-3788.

Martin Smallen et al., "Pole Tip Recession Measurenents on Thin Film Heads Using Optical Profilometry With Phase Correction and Atomic Force Microscopy," *Transactions of the ASME*, vol. 115, Jul. 1993, pp. 382-386.

Gilbert D. Feke et al., "Interferometric back focal plane microellipsometry," *Applied Optics*, vol. 37, No. 10, Apr. 1, 1998, pp. 1796-1802.

Peter de Groot, "Optical properties of alumina titanium carbide sliders used in rigid disk drives," *Applied Optics*, vol. 37, No. 28, Oct. 1, 1998, pp. 6654-6663.

Akiko Harasaki et al., "Offset of coherent envelope position due to phase change on reflection," *Applied Optics*, vol. 40, No. 13, May 1, 2001, pp. 2102-2106.

Richard K. Leach et al., EUROMET Project 413: Inter-laboratory comparison of measurements of the phase correction in the field of gauge block interferometry, Oct. 1, 2001.

"SPM in data storage," published at http://www.spntips.com/bibliography/data_storage/, downloaded Nov. 1, 2004.

"Hard Disk, MEMS & Semiconductor Appliances," published at http://www.taylor-hobson.com/nanotechnology_harddischeads.htm, downloaded Nov. 1, 2004.

Michael Zecchino, "Case Study: Improving Gauge Capability for High-Speed Process Control," © 2003 Veeco Instruments Inc.

Kurt Loken, "Advanced Pole Analysis: A New Tool for Measuring Pole Tip Recession," Copyright © 2002 Veeco Instruments Inc.

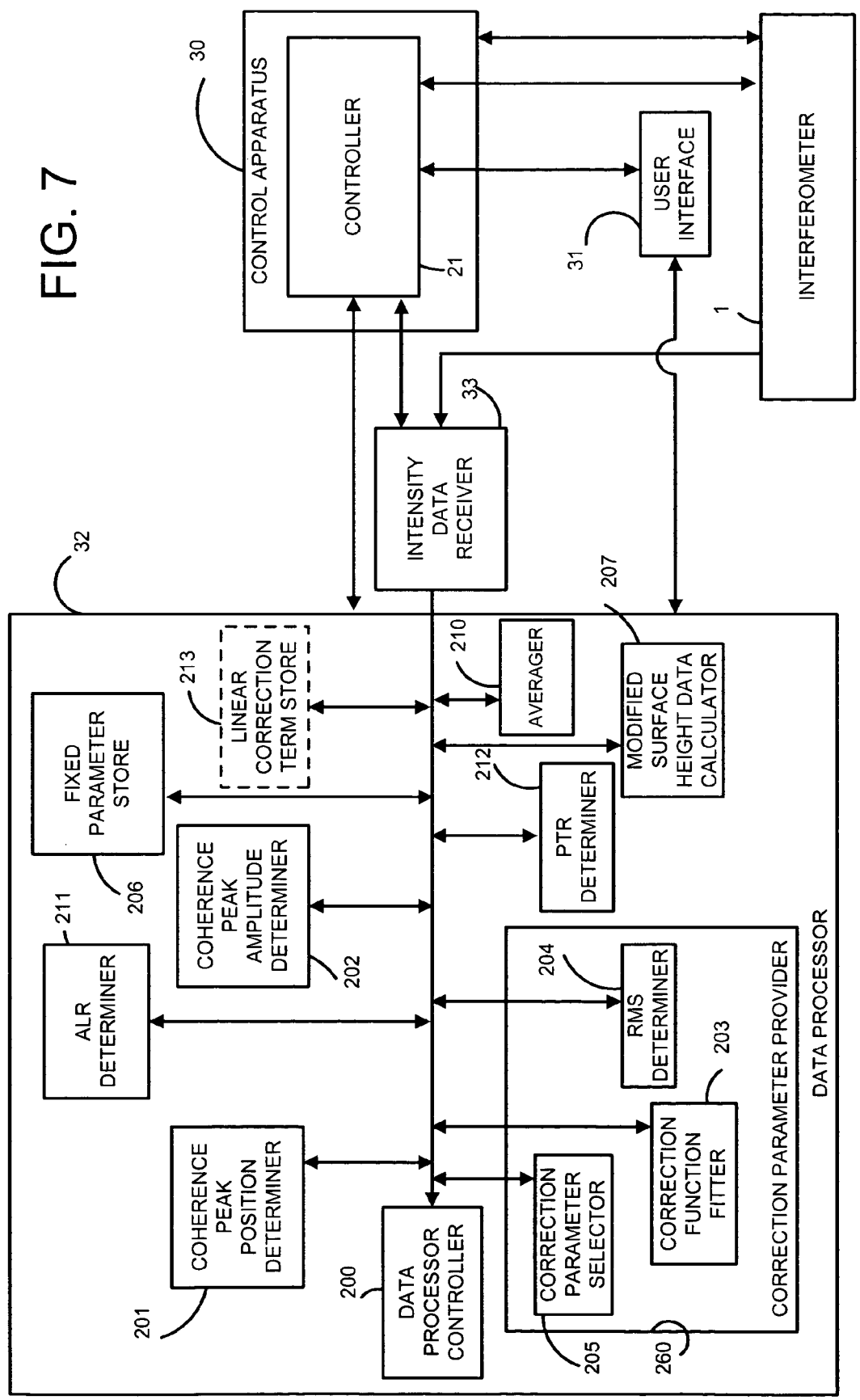

Evaluation of ß$_0$ - Al$_2$O$_3$-TiC Sq as a function of ß

Al$_2$O$_3$-TiC : Interference Phase

Al$_2$O$_3$-TiC : Interference Amplitude

Al$_2$O$_3$-TiC : Compensated Phase

Phase Correction for a 60μm * 40μm Al$_2$O$_3$-TiC Region

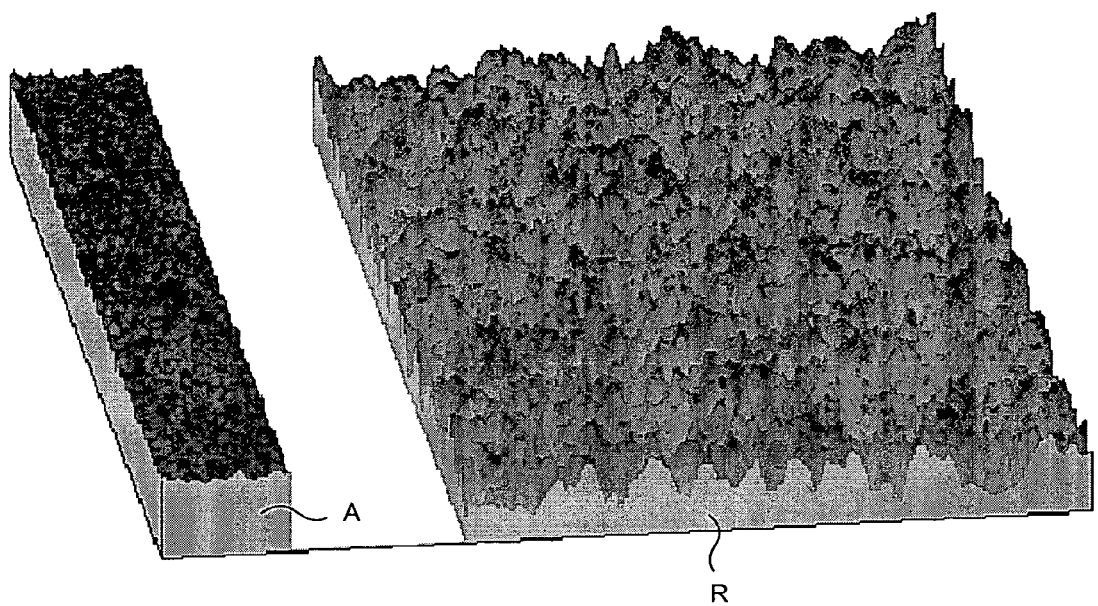
Uncompensated Al$_2$O$_3$-TiC together with Al$_2$O$_3$          FIG. 15a
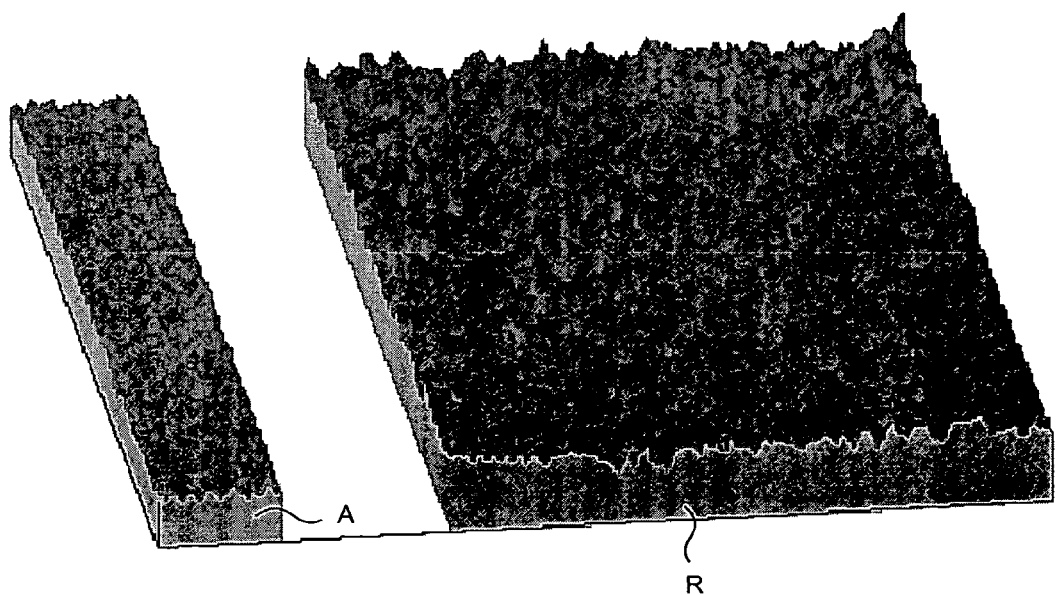
Compensated Al2O3-TiC together with Al$_2$O$_3$          FIG. 15b

INTERFEROMETER SYSTEM FOR AND A METHOD OF DETERMINING A SURFACE CHARACTERISTIC BY MODIFYING SURFACE HEIGHT DATA USING CORRESPONDING AMPLITUDE DATA

This invention relates to apparatus for and a method of determining a surface characteristic such as a surface profile or topography.

Coherence scanning or broadband scanning interferometry (sometimes called "Scanning White Light Interferometry" (SWLI)) is discussed in a paper entitled "Profilometry with a Coherence Scanning Microscope" by Byron S. Lee and Timothy C Strand published in Applied Optics Volume 29, No. 26 10 Sep. 1990 at pages 3784 to 3788.

Coherence scanning or broadband scanning interferometry uses a standard interferometer such as a Michelson, Mirau or Linnik interferometer with a broadband spatially incoherent light source such as a quartz halogen lamp. Unlike narrow band or single wavelength interferometry, coherence scanning or broadband scanning interferometry does not suffer from a wavelength limited unambiguous range, but can provide practical measurement ranges easily exceeding hundreds of micrometres.

In coherence scanning or broadband scanning interferometry, as one of the sample surface whose profile is to be determined and the reference mirror of the interferometer is moved relative to the other along a scan path to change the relative path length, a two dimensional image sensor such as a CCD camera is used to sense the resulting interference pattern such that each sensing element or pixel of the image sensor senses the portion of the interference pattern for a corresponding surface region or surface pixel of the sample surface.

As the sample surface and the reference mirror are moved relative to one another, the amount or intensity of light received by a sensing element will vary in accordance with the change in the interference fringes and, as shown in FIG. 2, a coherence peak or extremum (maximum or minimum amplitude) occurs at the position along the scan path Z of zero path difference. Where different regions of the surface have different relative heights, then those different regions will have coherence peaks at different positions along the scan path. Accordingly, the relative positions of the coherence peaks can be used to provide surface profile data, that is data representing the relative height of the different regions of the sample surface.

High precision metrology of read-write magnetic head sliders is of critical importance in the manufacture of components for rigid disk drives. In particular, it is important to be able to measure precisely differences in height that arise because of the different rates at which different materials are lapped in the chemical-mechanical polishing (CMP) techniques used during manufacture. Precise control over these height differences is important to enable as small as possible head-to-disk spacing to be achieved to reduce signal spacing loss without risking physical interference between the slider and the disc as the slider flies over the disc in operation. In particular there is a need to measure precisely: the pole tip recession (PTR parameter), that is the difference in height between the pole tip and an aluminium oxide-titanium carbide composite ($Al_2O_3$—TiC) air bearing surface; and 2) the "aluminium oxide trailing edge recession" (ALR parameter), that is the difference in height between an aluminium oxide overcoat of the pole tip and the aluminium oxide-titanium carbide composite air bearing surface.

As set out in a paper entitled "Pole Tip Recession Measurements on Thin Film Heads Using Optical Profilometry with phase Correction and Atomic Force Microscopy" by Martin Smallen and Jerry J. K. Lee published in Transactions of the ASME volume 115 July 1993 at pages 382 to 386, material dependent phase-change-on-reflection (PCOR) makes measurement of the PTR and ALR parameters with an optical profilometer difficult because of the composite $Al_2O_3$—TiC air-bearing surface.

As set out in the above-mentioned paper, one way of addressing this issue is to measure the optical constants of the pole tip and air bearing surface using an ellipsometer and to make corrections analytically. Another approach is to measure some samples of sliders before and after coating (usually vacuum chromium coating) to provide a top surface that follows the profile of the slider but has a uniform phase-change-on-reflection and to use those measurements to correct measurements made on uncoated heads. This, however, does not take into account manufacturing variations between sliders. A third approach would be to coat every slider but, as such coatings are difficult to remove, this could only be used as a destructive testing procedure, not for sliders manufactured for use. Another approach is to use an Atomic Force Microscope (AFM) to measure the PTR and ALR parameters of a sample slider and then to use these measurements to enable subsequent DC correction of measurements made using Scanning White Light Interferometry. Practically, therefore, previous attempts to measure these dimensions of magnetic read-write head sliders using scanning white light interferometry have additionally required the use of either atomic force microscopy (AFM) or ellipsometry to determine a precise height reference for the aluminium oxide-titanium carbide composite air bearing surface. However, the need to use an additional procedure inevitably increases the time required for the measurement operation, and AFM measurements in particular are slow. As measurements are required on every slider, this measurement operation represents a very time consuming part of the production process.

Similar problems may arise when using interferometric techniques to measure other surfaces formed of composite materials, that is materials that are not true compounds but are a physical mixture of the different materials.

An aspect of the present invention provides apparatus for and a method of processing interferometric data obtained by effecting relative movement between a composite material surface and a reference surface over a scan path to obtain, for each sensing element of an image sensor, interferometric data for the surface region imaged by that sensing element such that the interferometric data comprises, for each surface region, height or phase data representing the position along the scan path at which the coherence peak occurs and amplitude data representing the amplitude of the signal detected by the sensing element at the coherence peak, wherein a parameter of a function relating the height and amplitude data for a surface region is used to correct for the effect of phase change on reflection at that surface region of the composite material surface.

An embodiment of the present invention provides an apparatus and a method that enable automatic correction for phase-distortion effects associated with the interferometric measurement of $Al_2O_3$—TiC.

An embodiment of the present invention provides an apparatus and a method that enable automatic correction for phase-distortion effects associated with the interferometric measurement of $Al_2O_3$—TiC and that provide significant correction to the measured $Al_2O_3$—TiC surface roughness in addition to providing correction to allow the measurement of the ALR and PTR parameters.

An embodiment of the invention provides an apparatus and a method that obviate the need for independent measurements using ellipsometric and AFM techniques.

Embodiments of the present invention will now be described, by way of example, with reference to the accompanying drawings, in which:

FIG. 6b shows very much simplified underneath view of a magnetic read-write head slider of the rigid or hard magnetic disc drive shown in FIG. 6a;

FIG. 7 shows a functional block diagram of the apparatus shown in FIG. 1 illustrating in greater detail a data processor of the data processing and control apparatus;

Figure 14A:
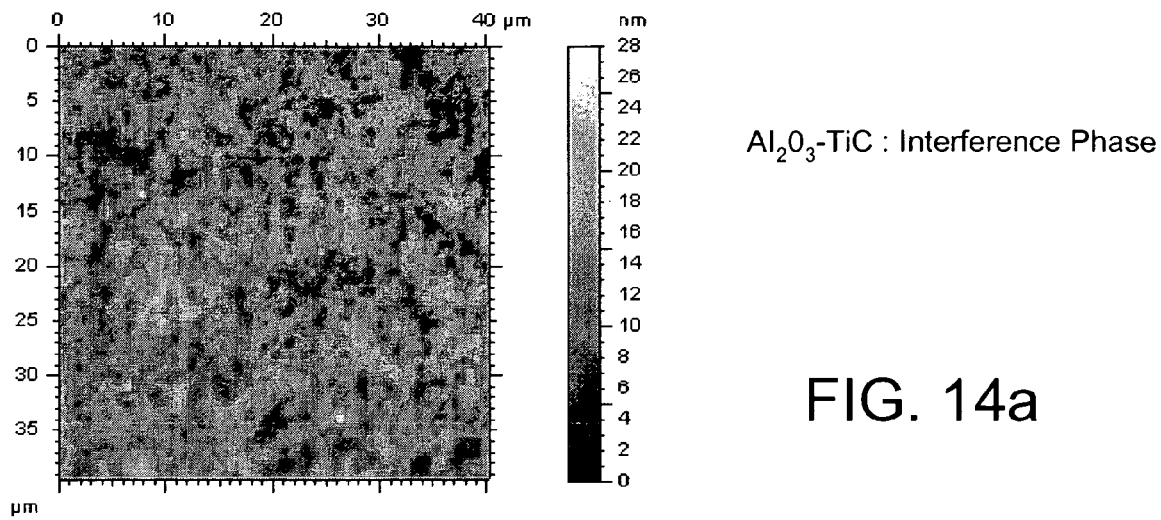
Figure 14B:
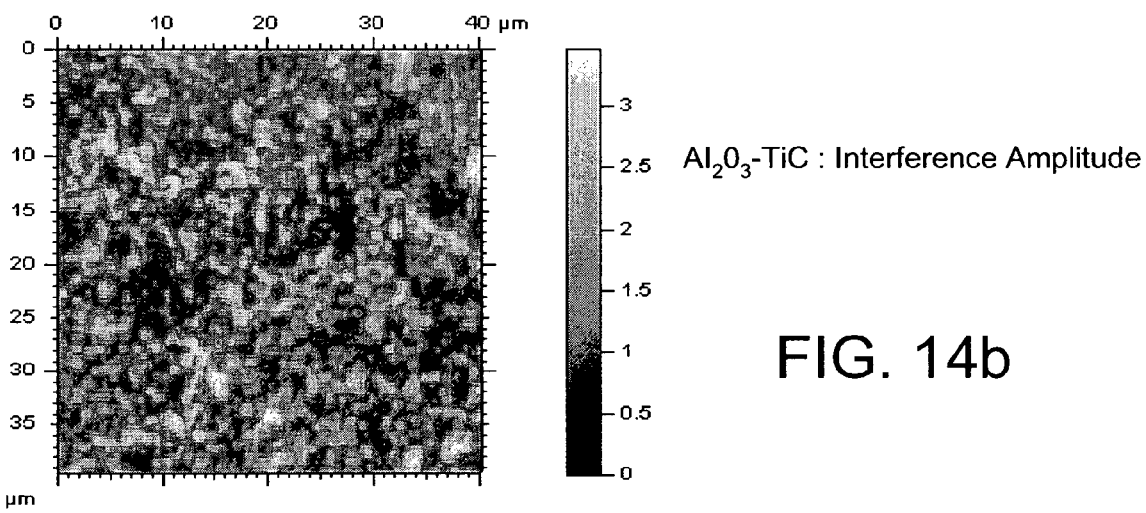
Figure 14C:
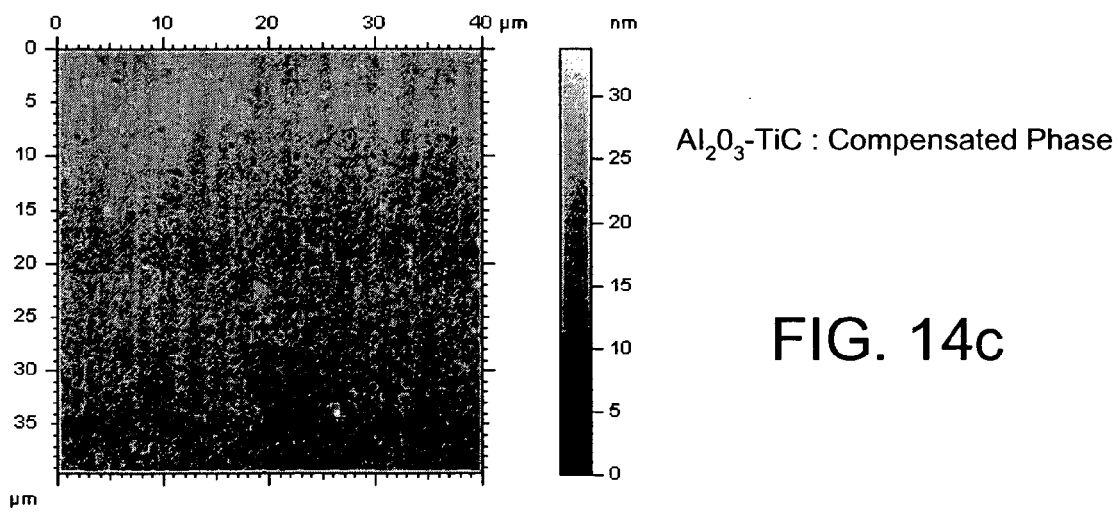
Figure 16:
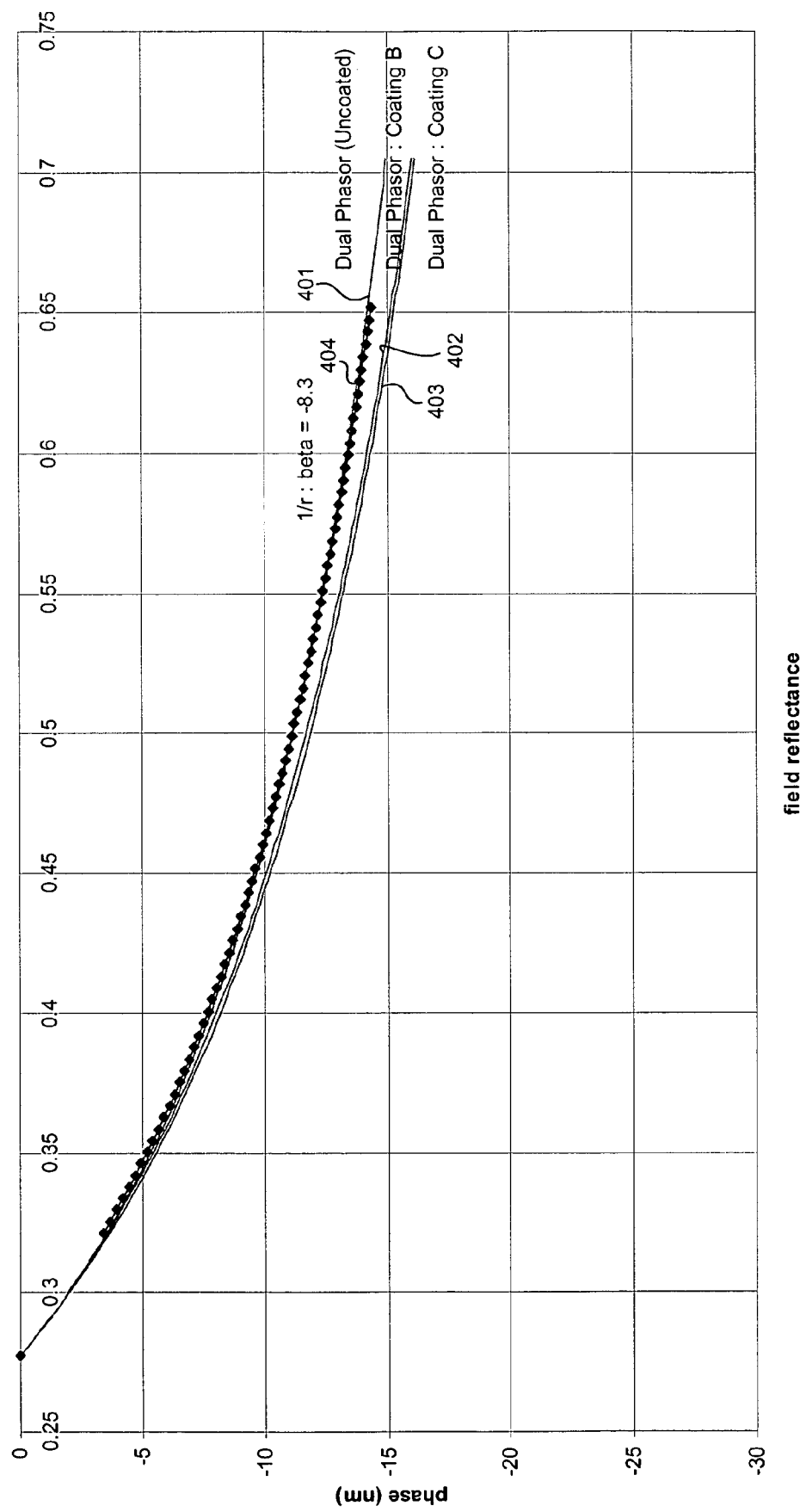
Figure 17:
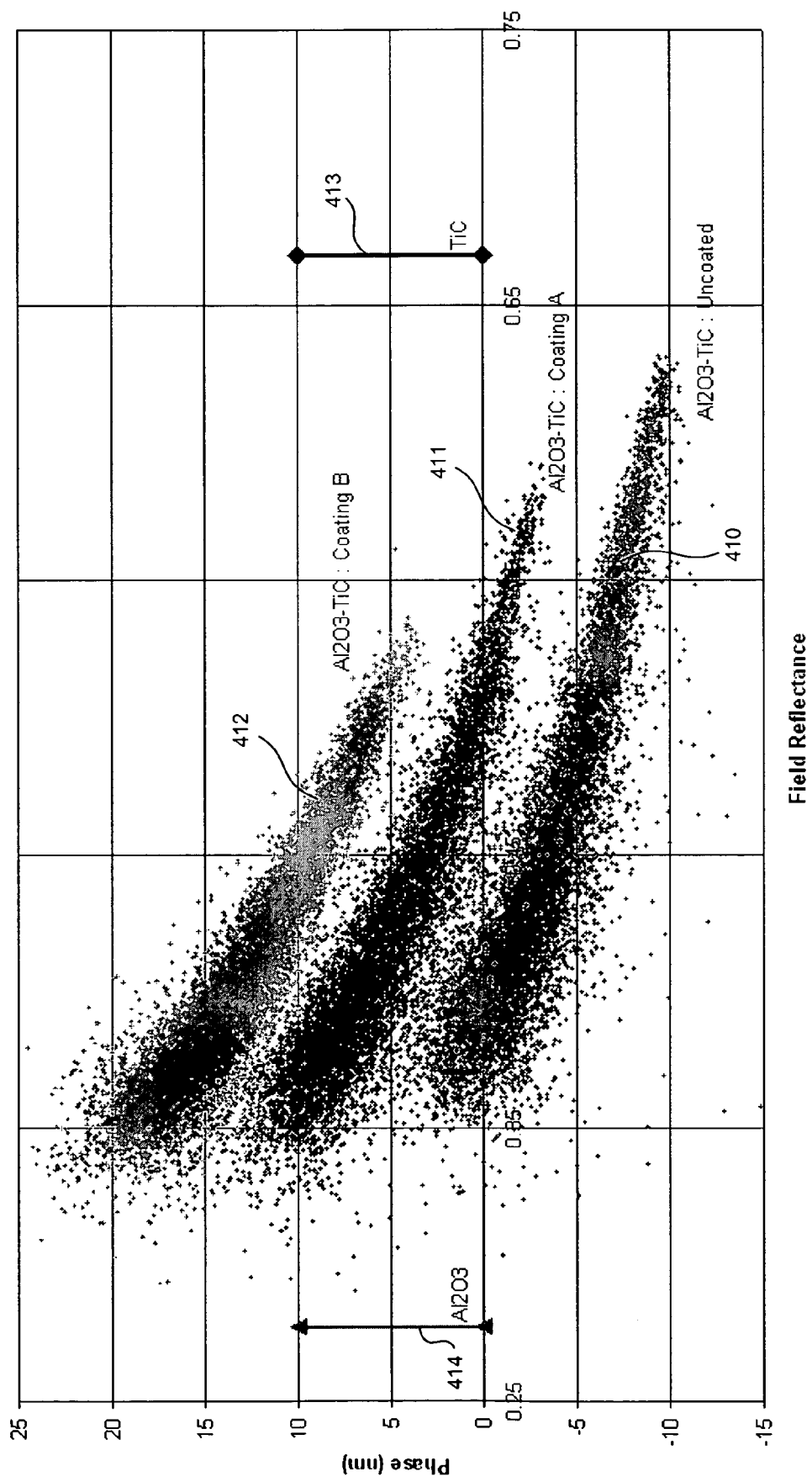
Figure 18:
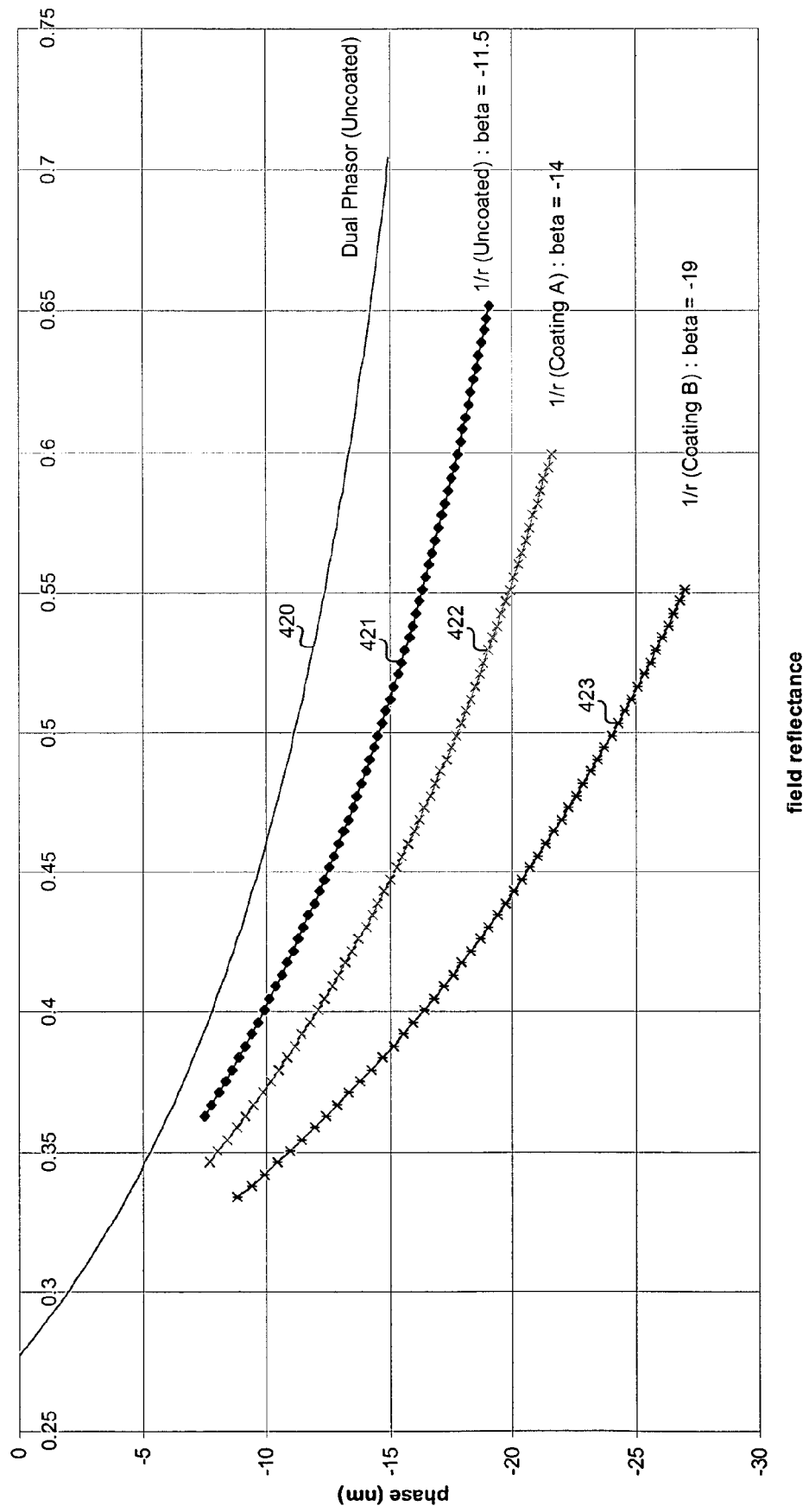
Figure 19:
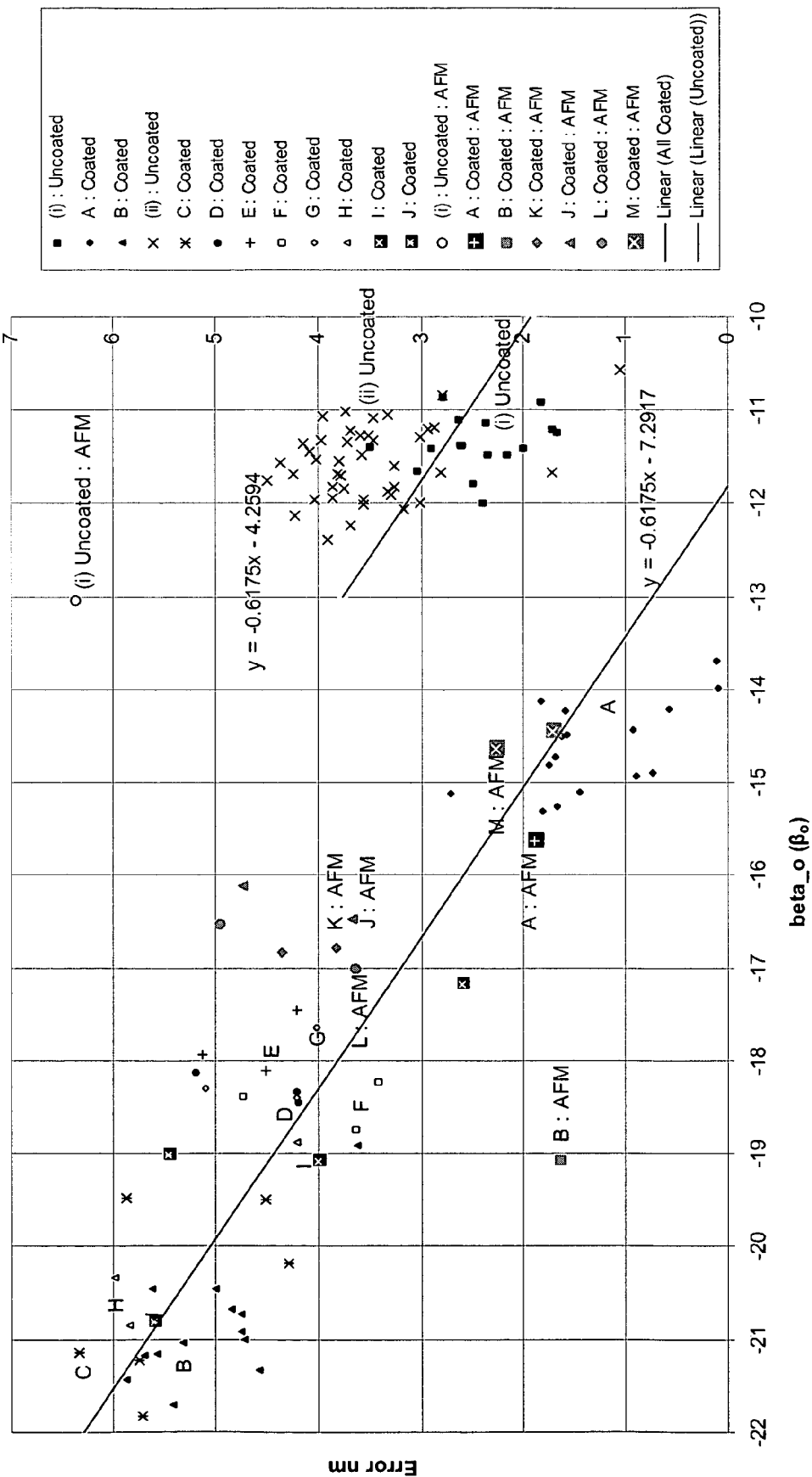
Figure 20:
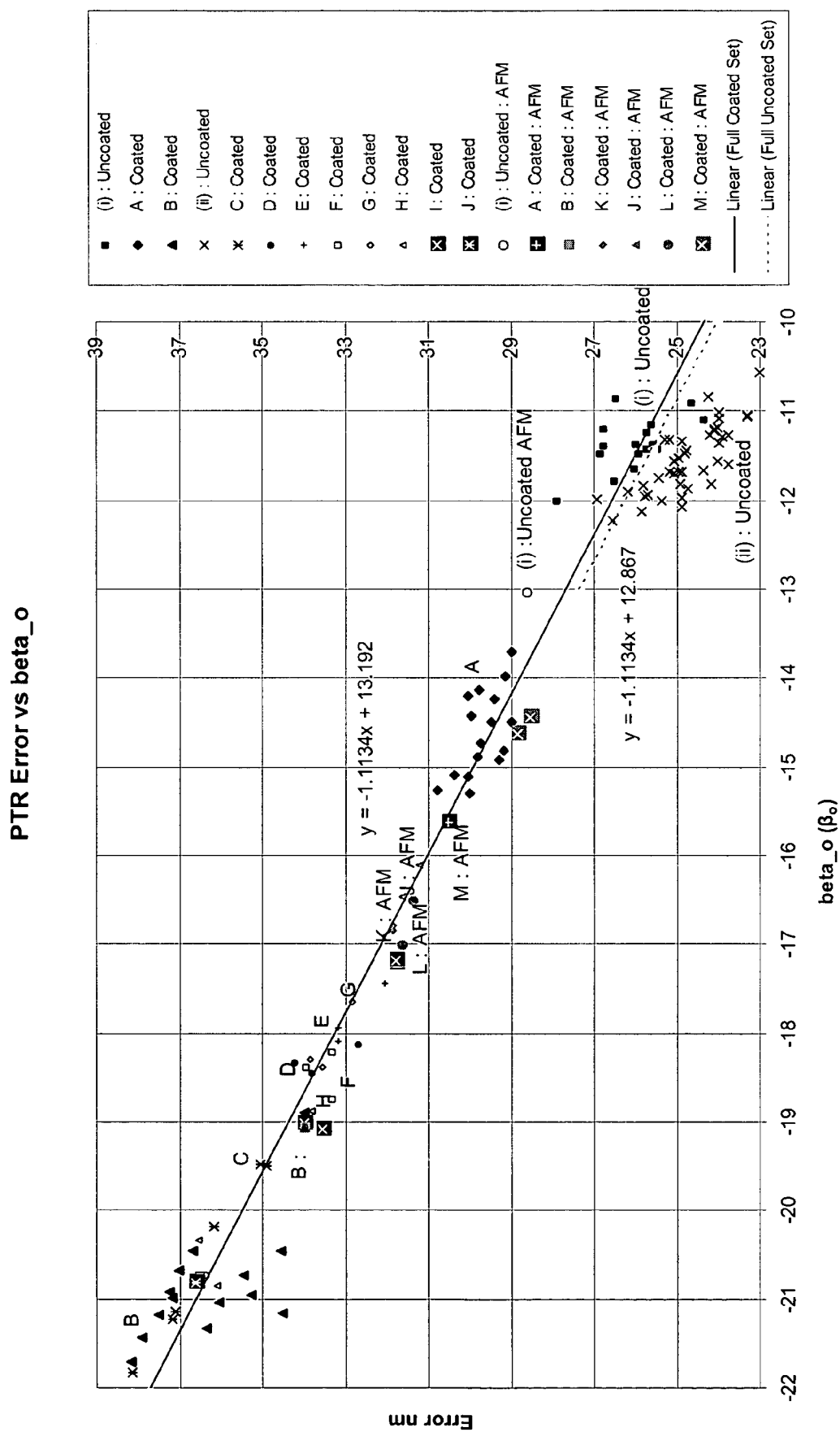
Figure 21:
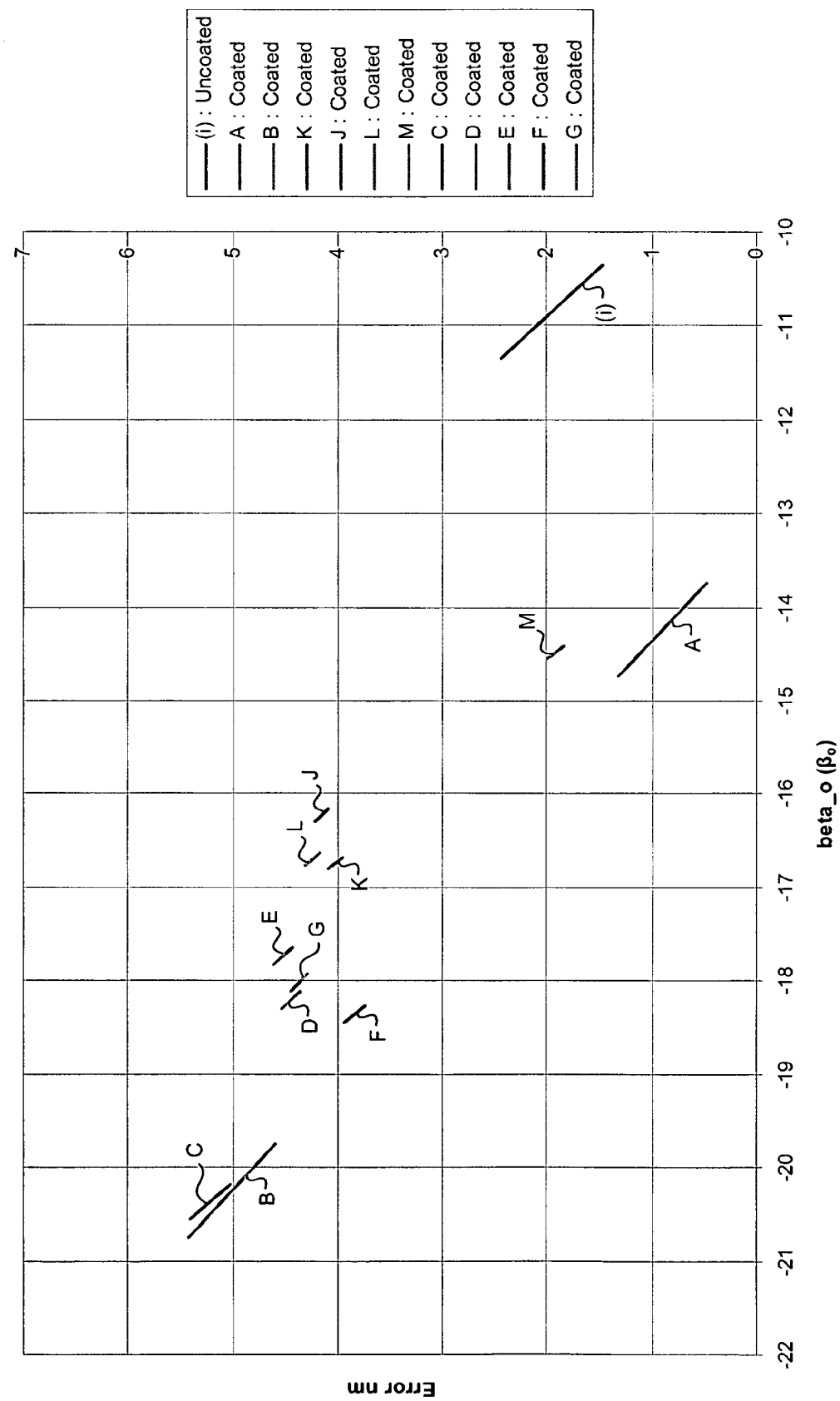
Figure 22:
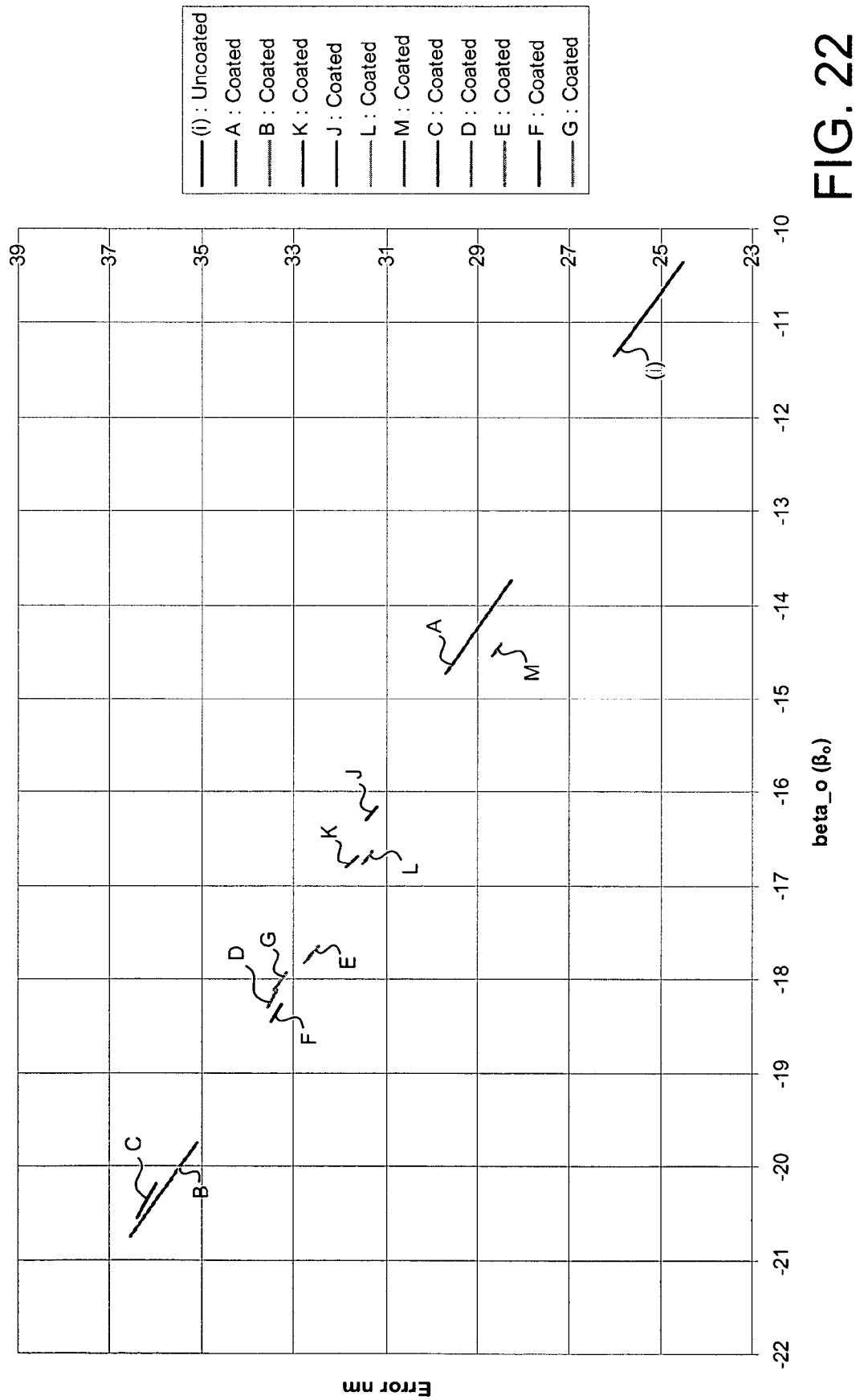

FIGS. 14a, 14b and 14c show two-dimensional plots each representing a two-dimensional array of surface regions or pixels of an area of an aluminium oxide-titanium carbide surface with FIG. 14a representing the surface height data for each surface pixel, FIG. 14b representing the amplitude of the coherence peak for each surface pixel and FIG. 14c representing the surface height data for each surface pixel after compensation for phase-change-on-reflection using a method embodying the invention that employs the inverse-amplitude model as the basis of the correction fitting function;

FIGS. 15a and 15b show perspective views of two-dimensional surface height data plots for an aluminium overcoat and the aluminium oxide-titanium carbide air bearing surface of a read-write magnetic head slider with FIG. 15a showing the data before and FIG. 15b showing the data after compensation for phase-change-on-reflection using a method embodying the invention;

FIG. 16 shows a graph representing the phase (in nanometres) against electric field reflectance predicted by the theoretical phase-reflectance model for both coated and uncoated aluminium oxide-titanium carbide surfaces and the results obtained for the uncoated aluminium oxide-titanium carbide surface using a method embodying the invention that employs the inverse-amplitude model as the basis of the correction fitting function FIG. 17 shows a graph representing experimentally determined phase (in nanometres) against electric field reflectance results for an uncoated aluminium oxide-titanium carbide surface and two coated aluminium oxide-titanium carbide surfaces;

FIG. 18 shows a graph representing the phase (in nanometres) against electric field reflectance predicted by the theoretical phase-reflectance model for an uncoated aluminium oxide-titanium carbide surface and the results obtained by using a method embodying the invention that fits a correction fitting function based on the inverse-amplitude model to the form of experimentally obtained data using different values for the correction parameter;

FIG. 19 shows a graph of error in nanometres (nm) in the determined ALR parameter against correction parameter values beta_o ($\beta_0$) for various different sliders, both coated and uncoated;

FIG. 20 shows a graph of error in nanometres (nm) in the determined PTR parameter against correction parameter values beta_o for various different sliders, both coated and uncoated;

FIG. 21 shows a graph of the mean error in nanometres (nm) in the determined ALR parameter against correction parameter value beta_o illustrating drift gradients for various different sliders, both coated and uncoated; and FIG. 22 shows a graph of the mean error in nanometres (nm) in the determined PTR parameter against correction parameter value beta_o illustrating drift gradients for various different sliders, both coated and uncoated.

Figure 1:
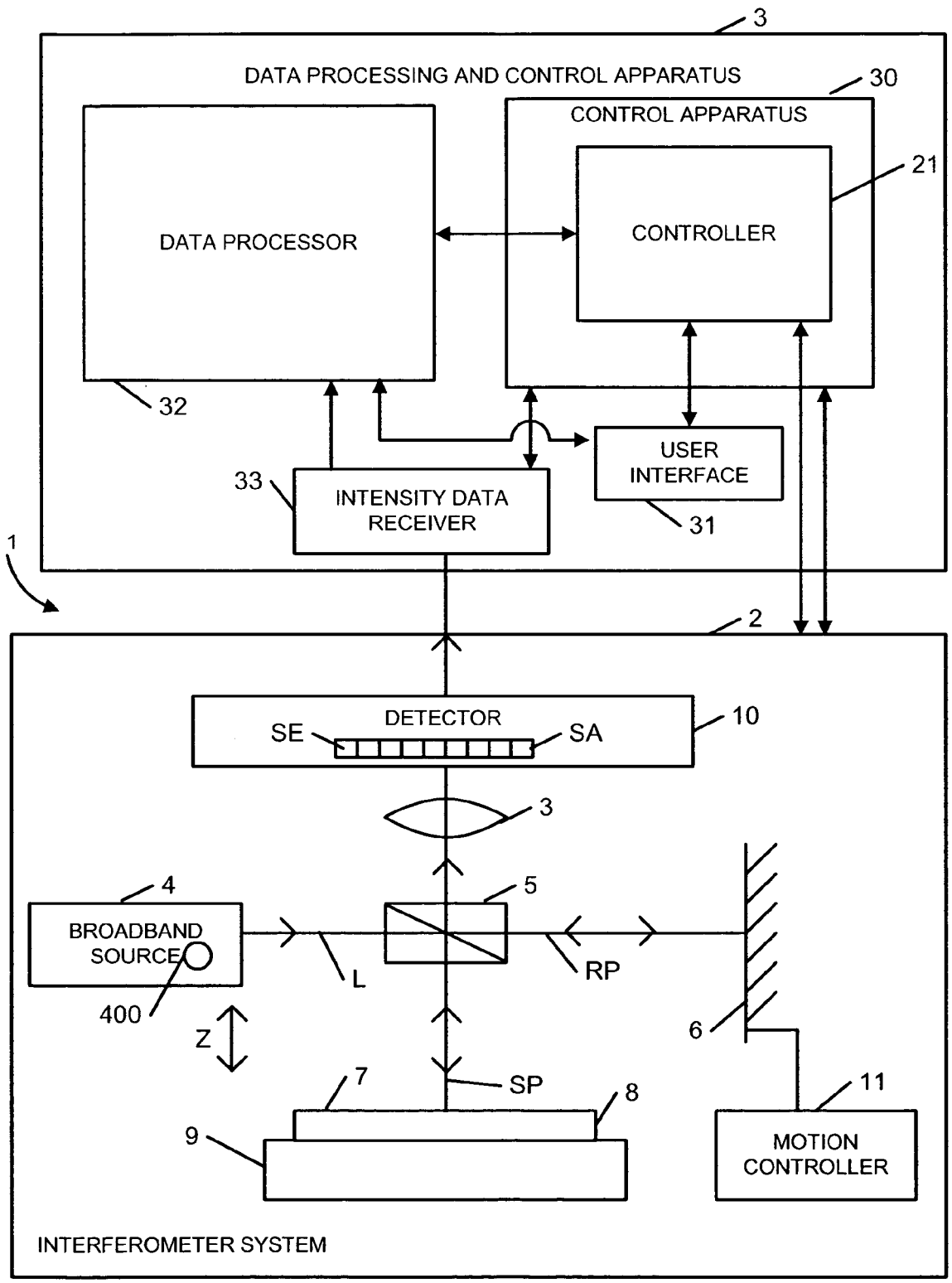
FIG. 1 shows a schematic block diagram of apparatus for determining a surface characteristic, the apparatus comprising an interferometer system and a data processing and control apparatus.

Referring now to the drawings, FIG. 1 shows a simplified schematic block diagram of apparatus 1 for determining a surface characteristic.

The apparatus 1 has a broadband or coherence scanning interferometer system 2 and data processing and control apparatus 3.

The broadband scanning interferometer system 2 is based on a conventional interferometer and, typically, has a Mirau, Michelson or Linnik configuration, for example. As discussed in the introduction, instead of having a monochromatic spatially coherent light source, the broadband scanning interferometer system 2 has a broadband source 4 which may be, for example, a white light source such as a quartz halogen lamp coupled to a regulated DC power supply having a light intensity output user control 400 provided, for example, in the form of a user-rotatable knob.

The broadband source 4 provides broadband light L which is split by a beam splitter (illustrated in FIG. 1 as a single beam splitting prism) 5 into a first light beam which is directed along a reference path RP towards a reference mirror 6 and a second light beam which is directed along a sample path SP towards a surface 7 of a sample 8 mounted on a sample support stage 9. Light reflected from the reference mirror 6 returns along the reference path RP to the beam splitter 5 where it interferes with light reflected from the sample surface 7 back along the sample path SP. A focussing element 3 is provided to focus an image of the region of interference onto a detector 10.

In this embodiment, the detector 10 has a 2D (two-dimensional) xy array SA of image sensing elements SE, one row of which is shown very diagrammatically in FIG. 1. The array SA images an area of the sample surface 7 falling within the field of view of the detector 10. Each individual sensing element SE of the 2D sensing array of the detector 10 detects the portion of the interference pattern falling within the acceptance cone of that element and resulting from a corresponding surface region or surface pixel of the area of the sample surface 7 so that, effectively, the imaged area of the surface can be considered as a 2D array of surface regions or surface pixels. In this example, the detector 10 is a CCD (Charge Coupled Device) digital camera, for example, As Vosskuhler GmbH: CCD 1300 CCD digital camera. As another possibility, a CMOS detector having a 2D (two-dimensional) xy array of CMOS sensing elements may be used. In either case, generally each of the sensing elements is square to provide the same resolution in both directions (x and y) of the array.

A motion controller 11 is provided to effect relative movement between the sample 8 and the combination of the reference mirror 6 and objective lens so as to change the difference between the lengths of the paths travelled by light reflected from the reference mirror 6 and light reflected from the sample surface 7. As shown in FIG. 1, the motion controller 11 is arranged to move the reference mirror 6 and objective lens combination along the reference path RP (see FIG. 3 because, for simplicity, FIG. 1 shows the motion controller simply coupled to the reference mirror 6). This is equivalent to moving the sample surface 7 along a scan path in the Z direction shown in FIG. 1.

The detector 10 is arranged to capture or sense the light intensity (i.e. the interference pattern) at intervals as the path length difference between the sample 8 and the reference mirror 6 is changed. In this example, the detector captures or senses the light intensity at intervals corresponding to axial changes in the relative position of the sample 8 of $\Delta z_{step} = \lambda/8$, where $\lambda$ is the nominal mean wavelength of the broadband source and the step is typically 75 nm. 2D image or frame data representing the intensity pattern for the field of view of the detector 10 is acquired by the detector 10 at each interval.

Figure 2:
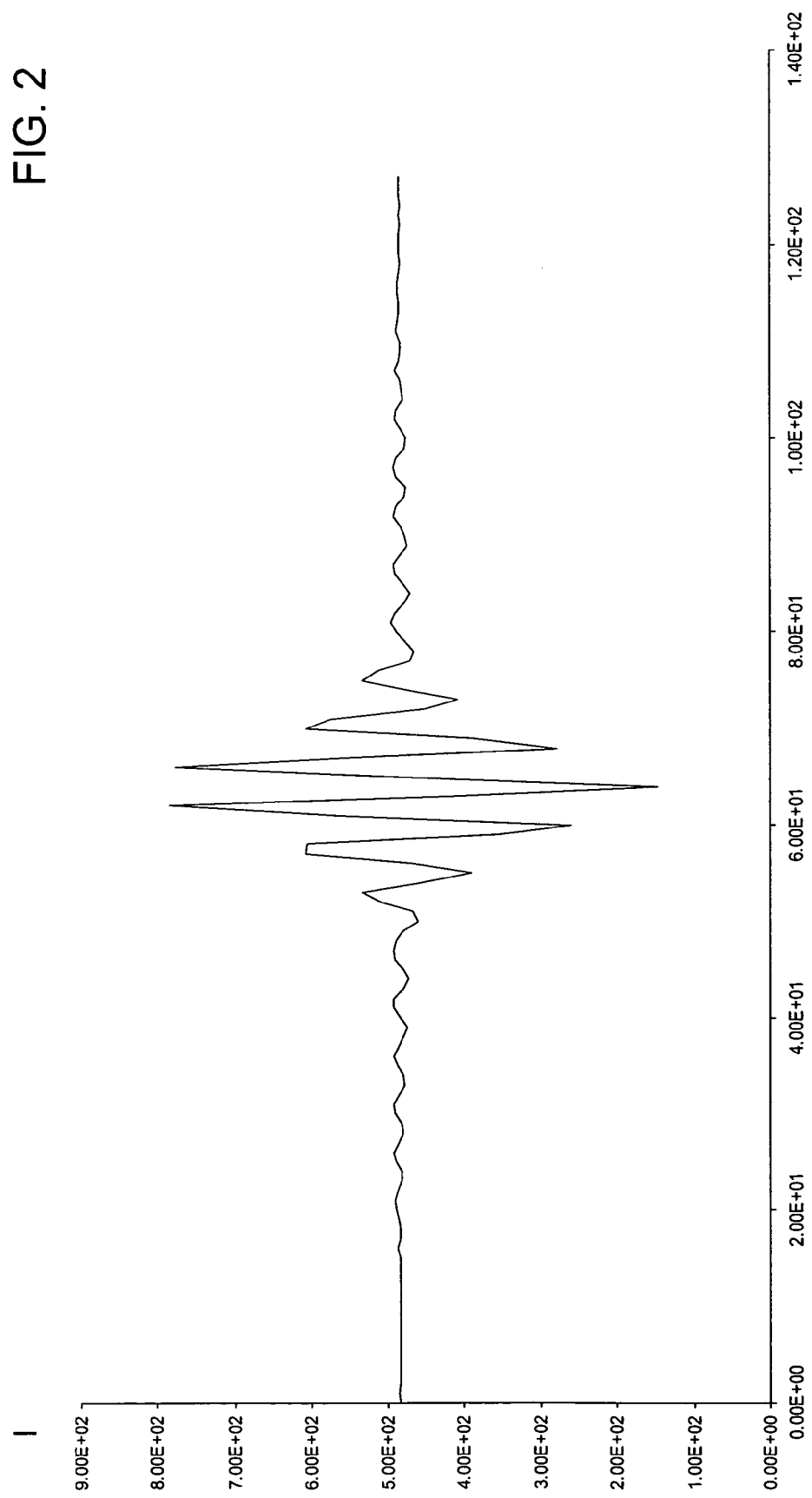
FIG. 2 shows a graph of intensity I against position Z to illustrate a typical example of the interference fringes for a sample surface region around a coherence peak or interference region.

The intensity of the illumination sensed by one sensing element of the 2D sensing array (that is the portion of the interference pattern provided by light reflected from the corresponding surface region or surface pixel of the sample surface 7 imaged on that sensing element) varies as the path length difference changes with movement of the reference mirror 6, resulting in a series of fringes which have a coherence peak at the position along the scan path corresponding to zero path length difference. FIG. 2 shows a graph of light intensity against position Z to illustrate the manner in which the intensity of the light sensed by a sensing element of the 2D sensing array of the detector 10 (and thus the interference fringe region) changes as the relative positions of the reference mirror 6 and sample surface 7 change. The envelope of the intensity distribution is the Fourier transform of the spectral distribution of the broadband source, modified by the spectral transmission of the instrument together with the spectral responsivity of the detector.

Further details of one example of an interferometer system 2 that may be used in the apparatus 1 will now be described with the aid of FIG. 3 which shows an overall functional block diagram of the apparatus 1 and FIG. 4 which shows a simplified side elevational view of the interferometer system 2.

Figure 3:
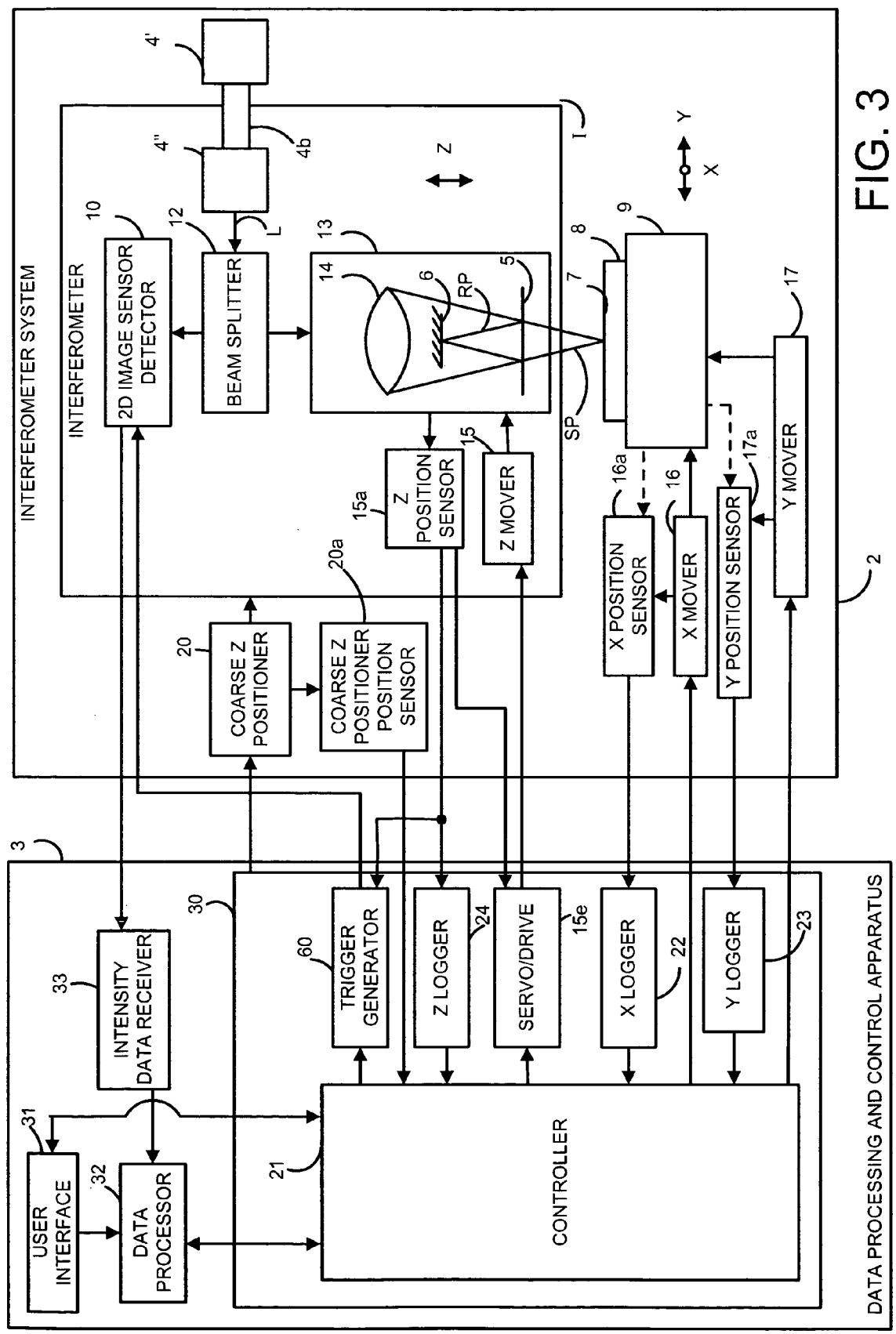
FIG. 3 shows a functional block diagram illustrating in greater detail one example of the apparatus shown in FIG. 1.
Figure 4:
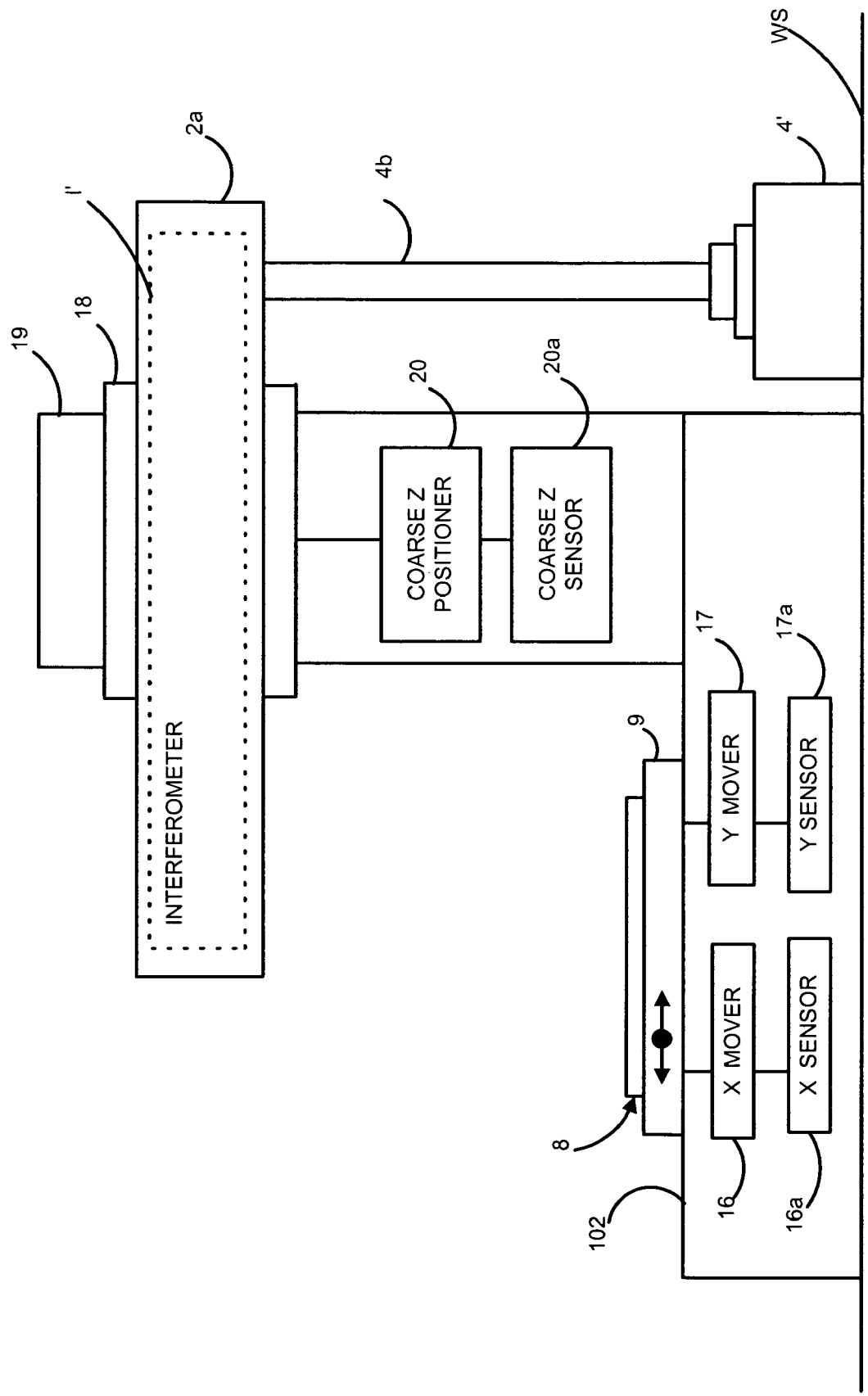
FIG. 4 shows a simplified side-elevational, part sectional view of one example of a suitable interferometer system for use in the apparatus.

In the example shown in FIGS. 3 and 4, the interferometer system 2 is based on a Mirau type interferometer.

As shown in FIG. 3, an interferometer I of the broadband scanning interferometer system 2 has a broadband source 4 having first and second components 4' and 4" optically coupled by an optical fibre cable 4b. The first component 4' houses a quartz halogen projector bulb (with associated reflector). The second component comprises a series of optical elements through which light from the optical fibre cable 4b is transmitted. In this example, the series consists of a diffuser, a changeable filter, an aperture stop, a lens, a field stop and a collimating lens that provides an emergent light beam L. The filter may be a neutral density filter or a band pass filter, designed to restrict the wavelength range of the light emitted by the broadband source 4, such as a Helium-Neon laser line filter designed to pass light having a Helium-Neon laser line wavelength.

The second component 4" of the broadband light source is arranged to supply broadband light L via a beam splitter 12 to an objective lens assembly 13 which includes, in addition to an objective lens 14, the beam splitter 5 and the reference mirror 6. The beam splitter 5 splits the light beam provided by the beam splitter 12 into a first reference beam that is directed along the reference path RP and a second sample beam that is directed along the sample path SP from the interferometer I towards the surface 7 of the sample 8 mounted on the sample support stage 9. Light returned to the beam splitter 12 is reflected towards the detector by the beam splitter and focussed onto the detector 10 by lens 3 (see FIG. 1).

The objective lens assembly 13, and thus the reference mirror 6, is movable in the Z direction by a Z direction mover 15, in this example a piezoelectric mover, under the control of servo/drive circuitry 15e of the control apparatus 30. The sample support stage 9 is movable in X and Y directions by an X mover 16 and a Y mover 17, respectively, to enable different areas of the sample surface 7 to be brought within the field of view of the detector 10.

As shown in FIG. 4, the majority I' of the components of the interferometer I of the broadband scanning interferometer system 2 (apart from first component 4' of the light source and the optical fibre cable 4b) are provided within a housing 2a mounted via a carriage 18 to a Z axis datum column 19. The carriage 18 is coupled via a drive mechanism (not shown) such as a ball screw or lead screw drive mechanism to a coarse Z positioner 20 in the form of a manually operable control or, in this example, a DC motor that enables the carriage 18 and thus the interferometer I to be moved up and down the column 19 in the Z direction to enable the interferometer to be moved to different scanning start positions.

As shown in FIG. 4, the sample support stage 9 is provided on a support 102 which houses the X and Y movers 16 and 17. The X and Y movers 16 and 17 comprise, in this example, DC motors coupled to the sample support stage 9 by appropriate conventional drive mechanisms such as rack and pinion or ball screw drive mechanisms (not shown). As shown in FIGS. 3 and 4, each of the Z, X and Y movers is associated with a corresponding position sensor 15a, 16a and 17a while the coarse Z positioner 20 may be associated with a coarse Z positioner position sensor 20a. The dashed lines between the support stage 9 and the X and Y position sensors 16a and 17a in FIG. 3 indicate that the position sensors may sense movement of the support stage 9 directly, rather than by signals derived from the corresponding motor.

As shown in FIG. 1, the data processing and control apparatus 3 has control apparatus 30 for controlling operation of the interferometer system 2, an intensity data receiver 33 for receiving intensity data signals from the detector 10, a data processor 32 for processing the intensity data under the control of a controller 21 of the control apparatus 30 and a user interface 31 for enabling a user or operator to control operation of apparatus, for enabling the user or operator to be provided with a data output representing the results of processing by the data processor 32 of the data acquired during a measurement operation and also for enabling messages such as error messages to be communicated to the user.

The controller 21 of the control apparatus 30 controls overall operation of the apparatus and communicates with the user interface 31 and data processor 32. The control apparatus 30 also includes, in this example, the servo drive circuitry 15e and X Y and Z loggers 22,23 and 24, each of which receives the output of the corresponding position sensor 16a, 17a and 15a, and a trigger generator 60 for triggering operation of the detector 10 in response to the output of the Z position sensor 15a to capture images at the required intervals. The controller 21 also receives an output from the coarse Z positioner position sensor 20a, if provided. The controller 21 may be programmed in known manner to compensate for any error in the Z position due to the slight arcuate nature of the motion of the objective lens assembly 13.

Figure 5:
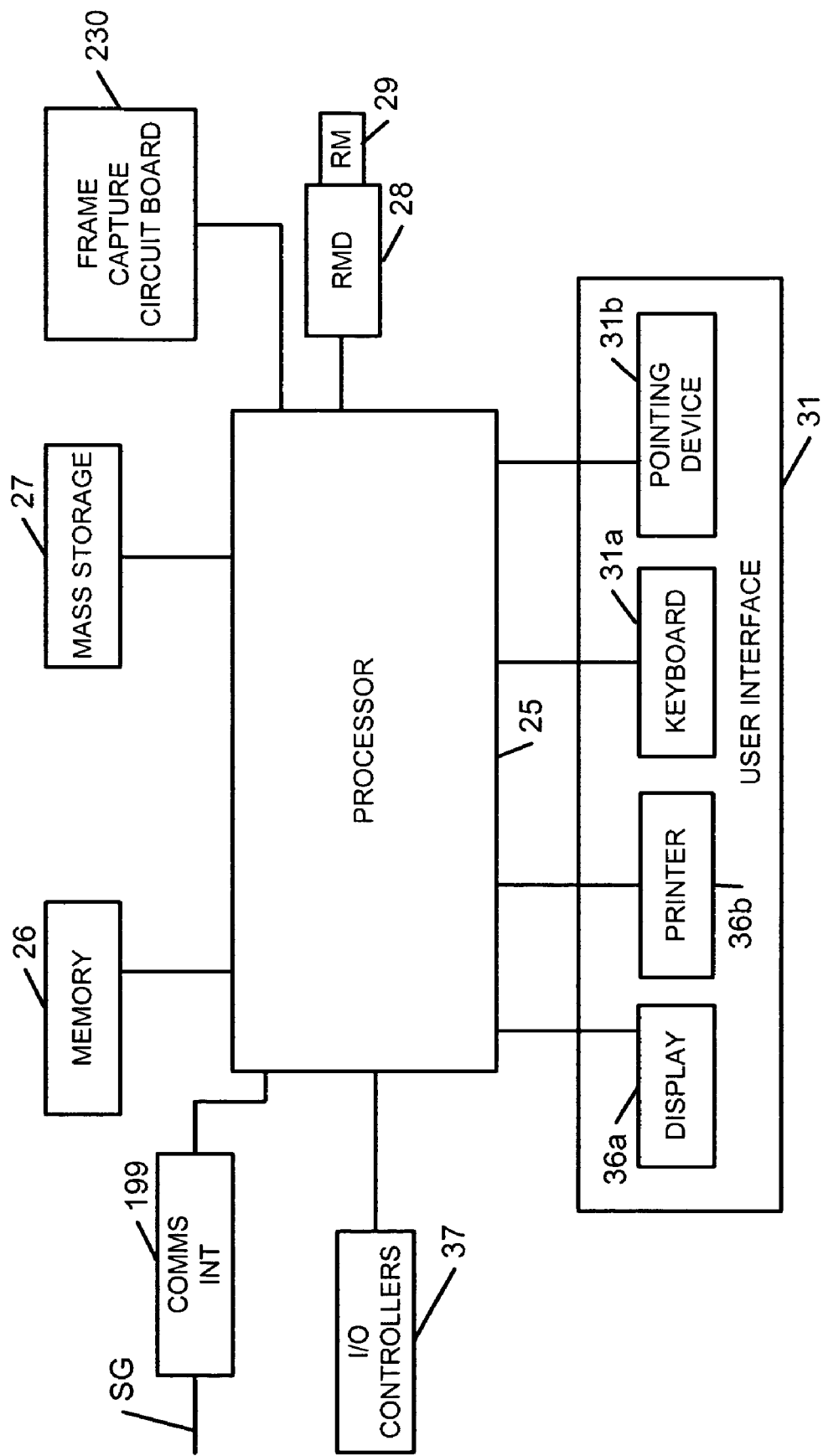
FIG. 5 shows a functional block diagram of computing apparatus that may be configured to provide the data processing and control apparatus shown in FIG. 3.

At least the controller 21 and data processor 32 of the data processing and control apparatus may be implemented by programming computing apparatus, for example a personal computer. FIG. 5 shows a simplified block diagram of such computing apparatus. As shown, the computing apparatus has a processor 25 associated with memory 26 (ROM and/or RAM), a mass storage device 27 such as a hard disk drive, a removable medium drive (RMD) 28 for receiving a removable medium (RM) 29 such as a floppy disk, CDROM, DVD or the like, input and output (I/O) controllers 37 for interfacing with the components of the broadband scanning interferometer system to be controlled by the control apparatus (for example, the Z, X and Y movers 15 to 17, the coarse Z positioner 20 and the detector 10) to enable the processor 25 to control operation of these components. The user interface 31 consists, in this example, of a keyboard 31a, a pointing device 31b, a display such as a CRT or LCD display 36a and a printer 36b. The computing apparatus may also include a communications interface (COMMS INT) 199 such as a modem or network card that enables the computing apparatus to communicate with other computing apparatus over a network such as a local area network (LAN), wide area network (WAN), an Intranet or the Internet. In this example, the intensity data receiver 33 is provided as a dedicated frame capture circuit board 230 installed within the computing apparatus.

The processor 25 may be programmed to provide the data processor 32 and controller 21 by any one or more of the following ways: 1) by pre-installing program instructions and any associated data in a non-volatile portion of the memory 26 or on the mass storage device 27; 2) by downloading program instructions and any associated data from a removable medium 29 received within the removable medium drive 28; 3) by downloading program instructions and any associated data as a signal SG supplied from another computing apparatus via the communications interface 199; and 4) by user input via the user interface 31.

As so far described, the apparatus is similar to that described in the applicant's international application publication number WO03/078925, the whole contents of which are hereby incorporated by reference. Further details of a typical example of the interferometer system 2 and the control apparatus 30 described with reference to FIGS. 3 to 5 may be found in WO03/078925 (our ref 3022799). An example of a commercially available apparatus that may be used is the Talysurf CCI 3000 produced by Taylor Hobson Limited of Leicester, England.

The present apparatus differs from that described in WO03/078925 in the configuration or programming of the data processor 32 that enables, as will be explained below, compensation for the surface height or phase measurement distortion that arises because of phase-change-on-reflection (PCOR) when determining the surface topography of a composite material, that is a material that is not a true compound but is a physical mixture of the different materials so that the surface comprises grains or islands of different materials of the order of a few micrometers or down to lower than submicron dimensions.

One example of such a surface is the aluminum oxide-titanium carbide air bearing surface of a read-write magnetic head slider for a rigid or hard disc drive.

Figure 6A:
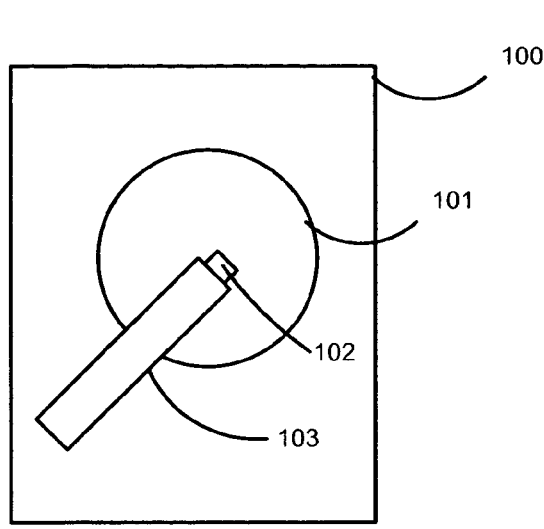
FIG. 6a shows a very much simplified diagrammatic plan view of a rigid or hard magnetic disc drive.

FIG. 6a shows a very much simplified diagrammatic plan view of a rigid or hard disc drive 100 having a hard disc 101 over which a magnetic read-write slider or head 102 is supported on an arm 103 so that, as the disc is rotated, the slider 101 follows a track along the disc surface.

Figure 6B:
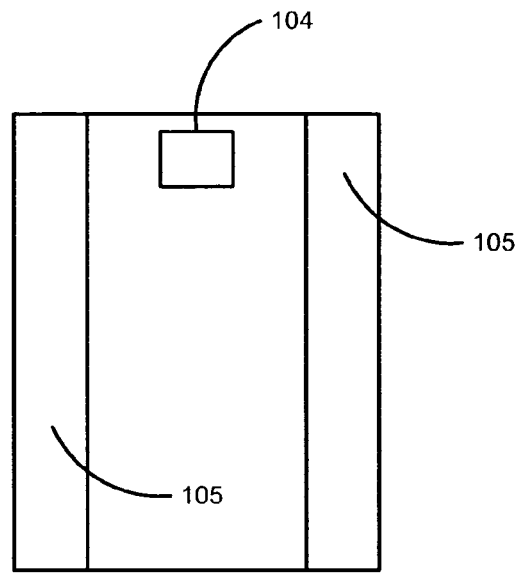

FIG. 6b shows very much simplified underneath view of the slider to illustrate the location of a pole tip region 104 of the slider relative to air bearing guide surfaces 105. It will be appreciated that FIG. 6b is merely schematic and that there are many different possible air bearing geometrical configurations. The pole tip region 104 is configured so that the magnetic read and write heads of the slider are aligned in the direction of the disc track.

Figure 6C:
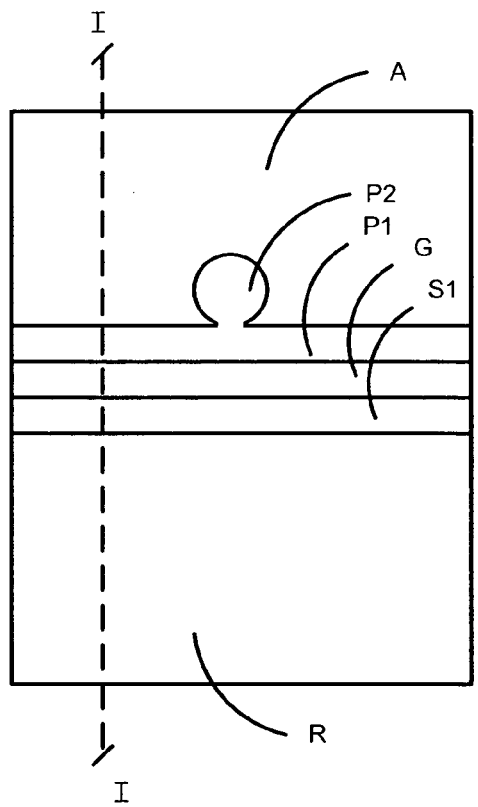
FIG. 6c shows a very simplified plan view of part of the slider shown in FIG. 6b to illustrate the relative locations of different surfaces of the slider.

FIG. 6c shows a very simplified plan view of part of the slider to illustrate various surface parts of the slider, in particular an aluminium oxide-titanium carbide ($Al_2O_3$—TiC) composite material air bearing surface R, a Cobalt-Nickel shield S1, an aluminium oxide ($Al_2O_3$) gap G, a Cobalt-Nickel read head pole P1, a Cobalt-Nickel write head pole P2 and an $Al_2O_3$ overcoat A.

Figure 6D:
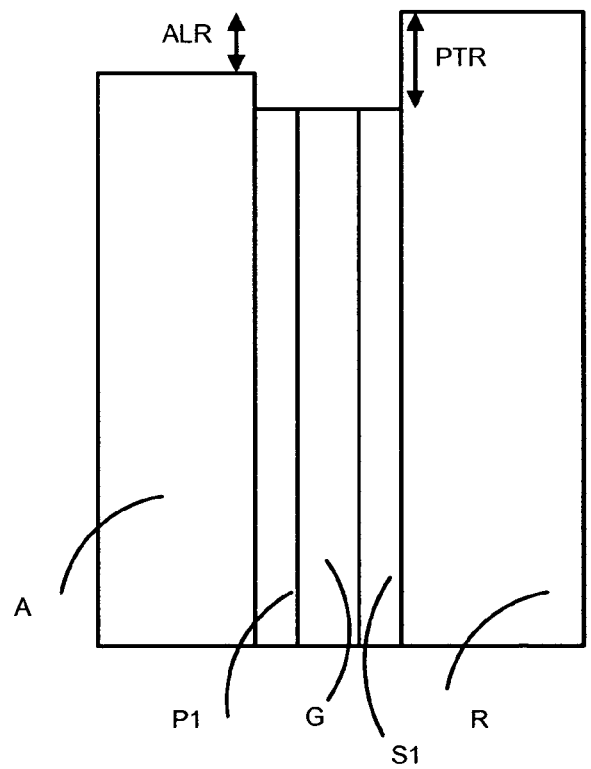
FIG. 6d shows a simplified diagrammatic cross-section taken along line I-I in FIG. 6c to illustrate the pole tip recession (PTR) and the aluminium oxide trailing edge recession (ALR)

As mentioned above, surface height differences occur on the slider surface because of the different degrees with which different materials are worn away during the chemical-mechanical polishing (CMP) during manufacture mentioned above. Thus, a difference in surface height, the pole tip recession (PTR), occurs between the pole tip P1 and the aluminium oxide-titanium carbide composite ($Al_2O_3$—TiC) air bearing surface R and a difference in surface height (the aluminium oxide trailing edge recession (ALR)) occurs between the aluminium oxide overcoat A and the aluminium oxide-titanium carbide composite air bearing surface R. FIG. 6d shows a simplified diagrammatic cross-section taken along line I-I in FIG. 6c to illustrate the pole tip recession (PTR) and the aluminium oxide trailing edge recession (ALR).

The ALR parameter is defined as being the average of two surface height measurements taken at different places on the aluminium oxide overcoat layer A, minus the height of the nominally flat aluminium oxide-titanium carbide composite ($Al_2O_3$—TiC) air bearing surface R. The PTR parameter is defined as being the average of surface height measurements of the Cobalt-Nickel shield layer S1 and the Cobalt-Nickel read head pole P1, minus the height of the nominally flat aluminium oxide-titanium carbide composite ($Al_2O_3$—TiC) air bearing surface R.

FIG. 7 shows a functional block diagram of the data processing and control apparatus 3 shown in FIG. 1 to illustrate the functional components provided by the data processor 32 that enable automatic phase distortion correction of surface height data obtained for a composite material surface such as the aluminium oxide-titanium carbide composite ($Al_2O_3$—TiC) air bearing surface mentioned above. As shown in FIG. 7, when programmed or configured by processor-implementable instructions, the data processor can be thought of as comprising of a number of functional units some of which may represent functionality provided by mechanical and/or electrical components of the apparatus, some of which may represent functionality provided by the programming and some of which may represent functionality provided by a combination of mechanical and/or electrical components and the programming. Therefore, the functional units illustrated in FIG. 7 do not necessarily correspond to specific hardware or software components or elements; for example in the case of software the programming will not necessarily be such that the individual units shown in FIG. 6 can be identified within the software. The data processor 32 has a data processor controller 200 for controlling overall operation of the data processor 32, a coherence peak position determiner 201 for determining the z position of the coherence peak for each surface pixel to provide surface height data for each surface pixel, a coherence peak amplitude determiner 202 for determining amplitude data for the coherence peak for each surface pixel, a correction function fitter 203 for fitting a correction function to the surface height and amplitude data for each surface pixel to provide compensated surface height data and a correction parameter provider 260 for providing a correction parameter value $\beta_0$ for use by the correction function fitter 203. In this example, the correction parameter provider 260 comprises an RMS determiner 204 for determining the RMS (Root Mean Square) roughness Sq of the compensated height data for each of a number of different correction parameter values and a correction parameter value selector 205 for selecting the correction parameter value $\beta_0$ for which the RMS (Root Mean Square) roughness Sq is a minimum.

The data processor 32 also has a modified surface height calculator 207 for modifying the surface height data for each surface pixel in accordance with a compensation factor determined by the corresponding amplitude data and the correction parameter value $\beta_0$ and by fixed parameters stored in a fixed parameter store 206. The modified surface height calculator 207 may provide the modified surface height data to the user interface 31.

The data processor also has PTR and ALR determiners 211 and 212 for determining the PTR and ALR parameters for a slider using the modified surface height data provided by the modified surface height data calculator 207.

The coherence peak position determiner 201 operates in one of the ways described in WO03/078925 to determine from interferometric data obtained during a measurement operation on a surface as described in WO03/078925 the z position $H_{ij}$ along the z path at which the coherence peak occurs for each surface pixel. This z position represents, for each surface pixel, the corresponding surface height, referred to herein as the "height" $H_{ij}$. This includes as discussed in WO03/078925 fitting a Gaussian to the interference data values provided by the intensity data receiver 33 for each surface pixel $SP_{ij}$ to determine the height $H_{ij}$ for that surface pixel. Normally, the approach to determining the surface height will be the approach described in WO03/078925 that uses phase data because this should provide better resolution.

The coherence peak amplitude determiner 202 determines the amplitude of the peak of the Gaussian fitted to the interference data values to determine the amplitude $A_{ij}$ for each surface pixel $SP_{ij}$. In this example, $N_{ij}$ bits are used to represent the grey scale levels where $N_{ij}$ is given by:

$$N_{ij} = \frac{N \cdot A_{ij}}{\overline{A_{Al_2O_3}}} \qquad 1)$$

in which $\overline{A_{Al_2O_3}}$ is the average amplitude for the $Al_2O_3$ overcoat A and N is the amplitude data value for the aluminium oxide overcoat A which is for the Talysurf CCI instrument taken to be 3000.

As is well known in the field of interferometry, the amplitude $A_{ij}$ of the interference signal (which is determined by the intensity data value provided by the intensity data receiver 33) is proportional to the electric field reflectance $r_{ij}$ while the surface height $H_{ij}$ is related to the phase $\phi_{ij}$ as follows:

$$H_{ij} = \frac{\lambda}{4\pi} \varphi_{ij} \qquad 2)$$

where $\lambda$ is the nominal wavelength of the broadband source.

The data processor 32 shown in FIG. 7 enables, as will now be described, compensation for phase-change-on-reflection without the need for separate AFM or ellipsometer measurements on the slider. This is achieved by means of a surface height-amplitude model (in the example to be described below an inverse amplitude model), the basis for which is a theoretical phase-reflectance model (also referred to herein as the "Dual-Phasor" Model) that relates the electric field reflectance and phase for each surface pixel.

The value of the complex refractive index k of the composite material ceramic $Al_2O_3$—TiC measured at low numerical aperture (NA) is approximately 0.46 at a nominal wavelength $\lambda$ of 600 nm (nanometres). This implies that the mean 1/e electric field penetration depth is approximately 10 μm (micrometres). The grains or islands of the two materials making up this composite material typically have dimensions of the order of less than about 1.5 micrometers but can have dimensions smaller than sub-micron. In terms of the observed structure size within this ceramic, 10 μm is therefore a relatively large distance. This implies that, for a given value of electric field reflectance, there will be a spread of phase change on reflection.

Figure 8:
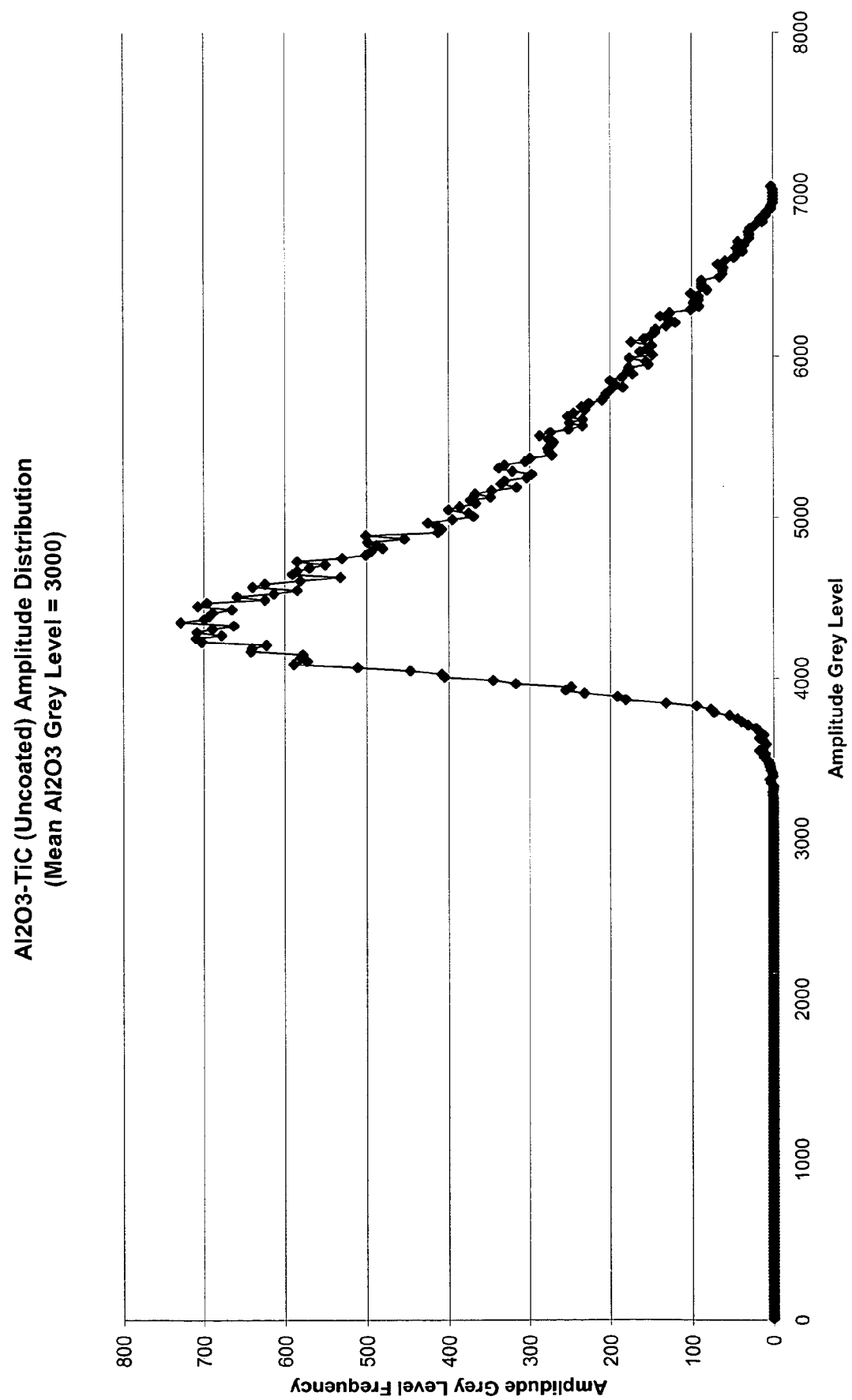
FIG. 8 shows a graph of amplitude grey level frequency against amplitude grey level for an uncoated aluminium oxide-titanium carbide surface.

FIG. 8 plots the amplitude grey level frequency against the amplitude grey level of intensity value data obtained for an uncoated $Al_2O_3$—TiC composite material surface. This frequency distribution shows a continuous change in grey level and does not provide the two separate peaks that would be inferred from corresponding measurements made by AFM techniques and that may be expected for a composite material surface having areas of two different materials. The present inventor has determined from the relationship between this amplitude frequency distribution and the corresponding phase change frequency distribution, that the relationship between the phase and corresponding amplitude (that is the relationship between the surface height and corresponding amplitude data) for the surface pixels of the surface being measured is key in addressing the phase distortion caused by phase-change-on-reflection at composite material surfaces.

Figure 9:
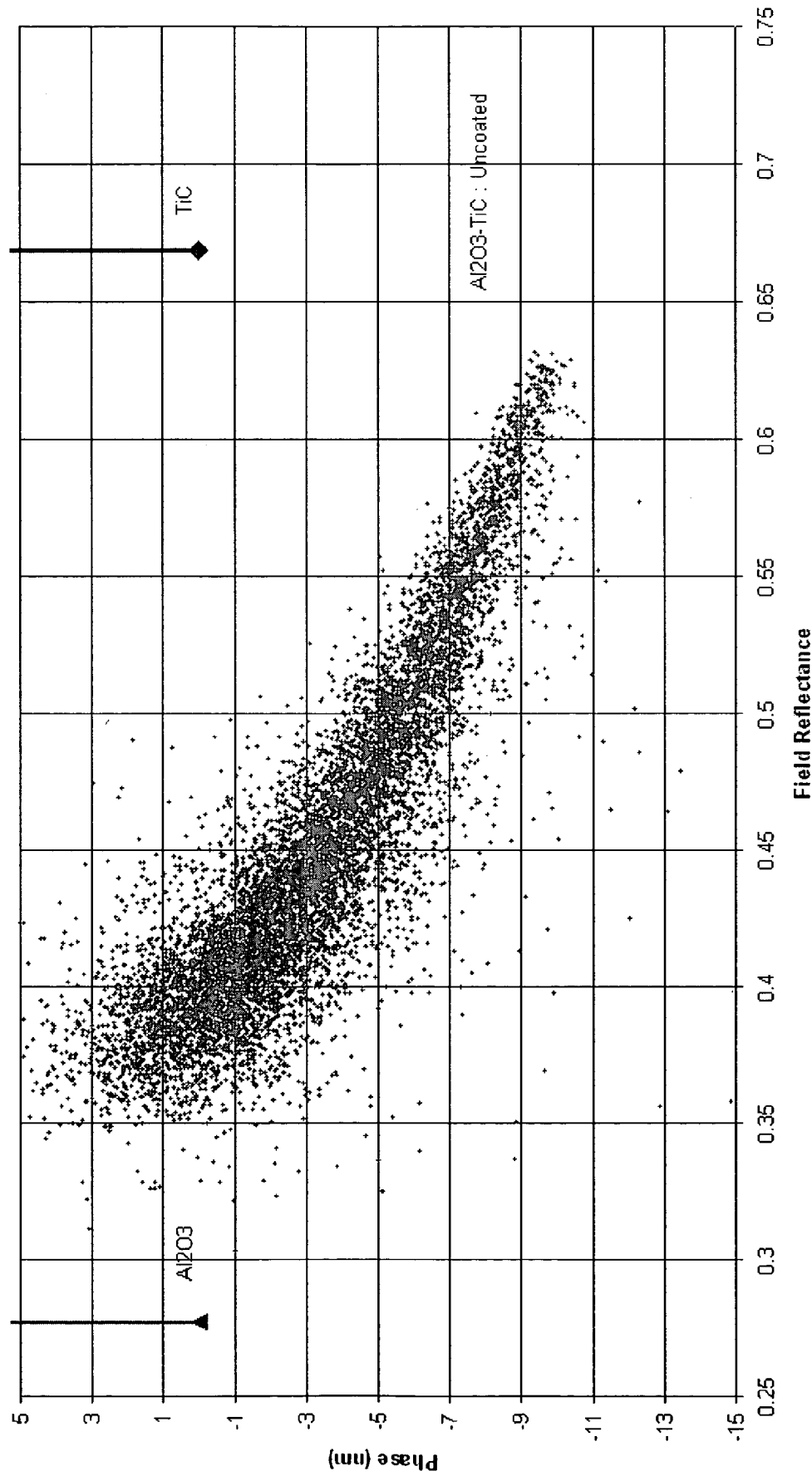
FIG. 9 shows a graph of phase in nanometres (nm) against electric field reflectance for a data set derived from surface pixel height and corresponding amplitude data obtained from intensity value data resulting from a measurement operation made on an uncoated aluminium oxide-titanium carbide surface using the interferometer system shown in FIGS. 1, 3 and 4.

FIG. 9 plots, for the same slider as in FIG. 8, the phase $\phi_{ij}$ in nanometres (as determined from the height data $H_{ij}$ determined by the coherence peak position determiner 201) as a function of the electric field reflectance $r_{ij}$ for each surface pixel of a measured area of an uncoated $Al_2O_3$—TiC composite material surface. The electric field reflectance $r_{ij}$ is given:

$$r_{ij} = r_{Al_2O_3} \cdot \frac{N_{ij}}{N} \left( = r_{Al_2O_3} \cdot \frac{A_{ij}}{\overline{A_{Al_2O_3}}} \right) \quad 3)$$

where $A_{ij}$ the amplitude data obtained by the coherence peak amplitude determiner 202 for surface pixel $SP_{ij}$, $\overline{A_{Al_2O_3}}$ is the average amplitude data value for the $Al_2O_3$ overcoat A, and $r_{Al_2O_3}$ is the electric field reflectance for $Al_2O_3$ which is determined from the known real and imaginary parts n and k of the complex optical admittance for $Al_2O_3$.

FIG. 9 clearly illustrates a spread of phase-change-on-reflection. Despite the spread of phase change on reflection, the overall form of a function relating the phase-change-on-reflection to electric field reflectance (hereinafter referred to as the "phase-reflectance function") may be established and corrected.

A theoretical approximation to this phase-reflectance function, referred to herein as the "Dual Phasor Model" or theoretical phase-reflectance model, may in the first instance be obtained by ignoring any bandwidth issues and assuming that the net electric field reflectance is a linear combination of the mean electric field reflectances (integrated over the net numerical aperture of the lens of the interferometer system) of the $Al_2O_3$ and TiC making up the composite material. The TiC electric field reflectance may be modified by an additional surface height or phase term to take account of the fact that, as is well-known and is apparent from AFM measurements, the CMP processing during manufacture results in the TiC grains standing proud by a height distance H of typically approximately 2 nm from the $Al_2O_3$ matrix in which they are embedded. This approach therefore evaluates:

$$\overline{r}e^{i\varphi}(\alpha) = (1-\alpha) \frac{\int_{NA_{min}}^{NA} \theta \overline{r_{Al2O3}}(\theta) e^{i\varphi_{Al2O3}(\theta)} d\theta}{\int_{NA_{min}}^{NA} \theta d\theta} + \alpha \frac{\int_{NA_{min}}^{NA} \theta \overline{r_{TiC}}(\theta) e^{i\varphi_{TiC}(\theta)} e^{i\frac{4\pi}{\lambda_o} H\cos\theta} d\theta}{\int_{NA_{min}}^{NA} \theta d\theta} \quad 4)$$

where r is the reflected amplitude, $\phi$ is the phase, $\theta$ is the angle to the normal of the aperture, $\lambda_o$ is the nominal wavelength of the incident light and the overbars indicate the average of both p and s polarisation planes.

Figure 10:
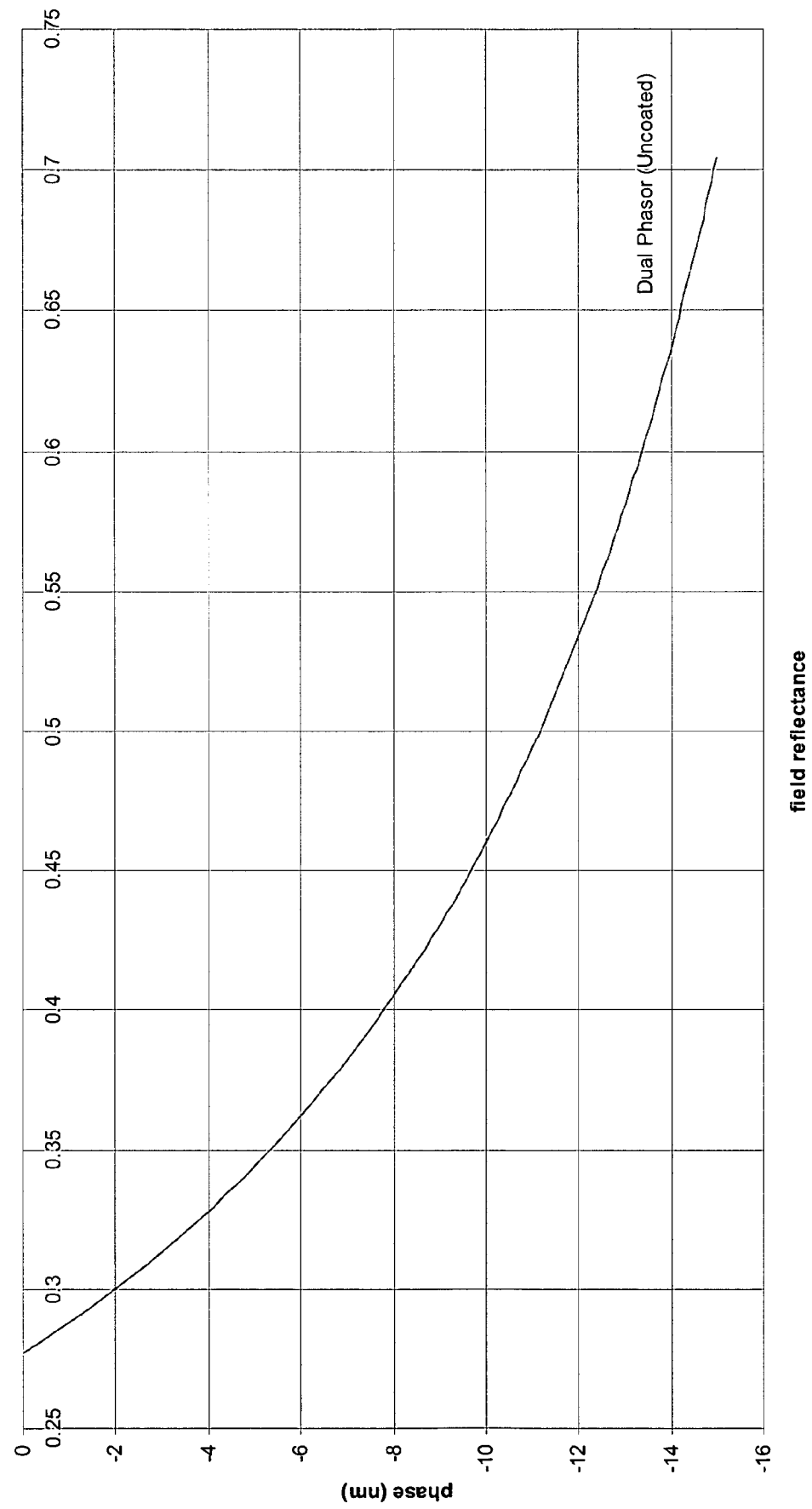
FIG. 10 shows a graph illustrating the results obtained with a theoretical phase-reflectance model that relates phase in nanometres (nm) to electric field reflectance.

The reflected amplitude r and phase-change $\phi$ are therefore given as a function of the parameter $\alpha$, the ratio at any given surface location of TiC to $Al_2O_3$ (within the point-spread-function). The above equation can be computed numerically to obtain the relationship between the phase and the electric field reflectance by first computing the integrals and then computing the phase and the electric field reflectance for values of $\alpha$ varying from 0 to 1. This provides an approximation to the 'phase-change-on-reflection versus field reflectance' (phase-reflectance) function. FIG. 10 shows a graph illustrating the obtained relationship between the phase and the electric field reflectance obtained with this "Dual Phasor" model. A comparison of FIGS. 9 and 10 shows that this simple approximation is in agreement with the form of the equivalent measured data.

The data processor 32 fits a correction function relating surface height (or phase) and amplitude to the form of the data set that, as shown in FIG. 9, represents the height and corresponding amplitude data for the surface pixels of the surface being measured.

The data processor 32 then removes the fitted form to correct the measured surface height data as will be described below with reference to FIGS. 7 and 11 to 13.c The correction function fitter 203 may use a quadratic correction function but it is advantageous to use a correction fitting function that involves a simple power because this only requires a single defining parameter $\beta$.

Figure 11:
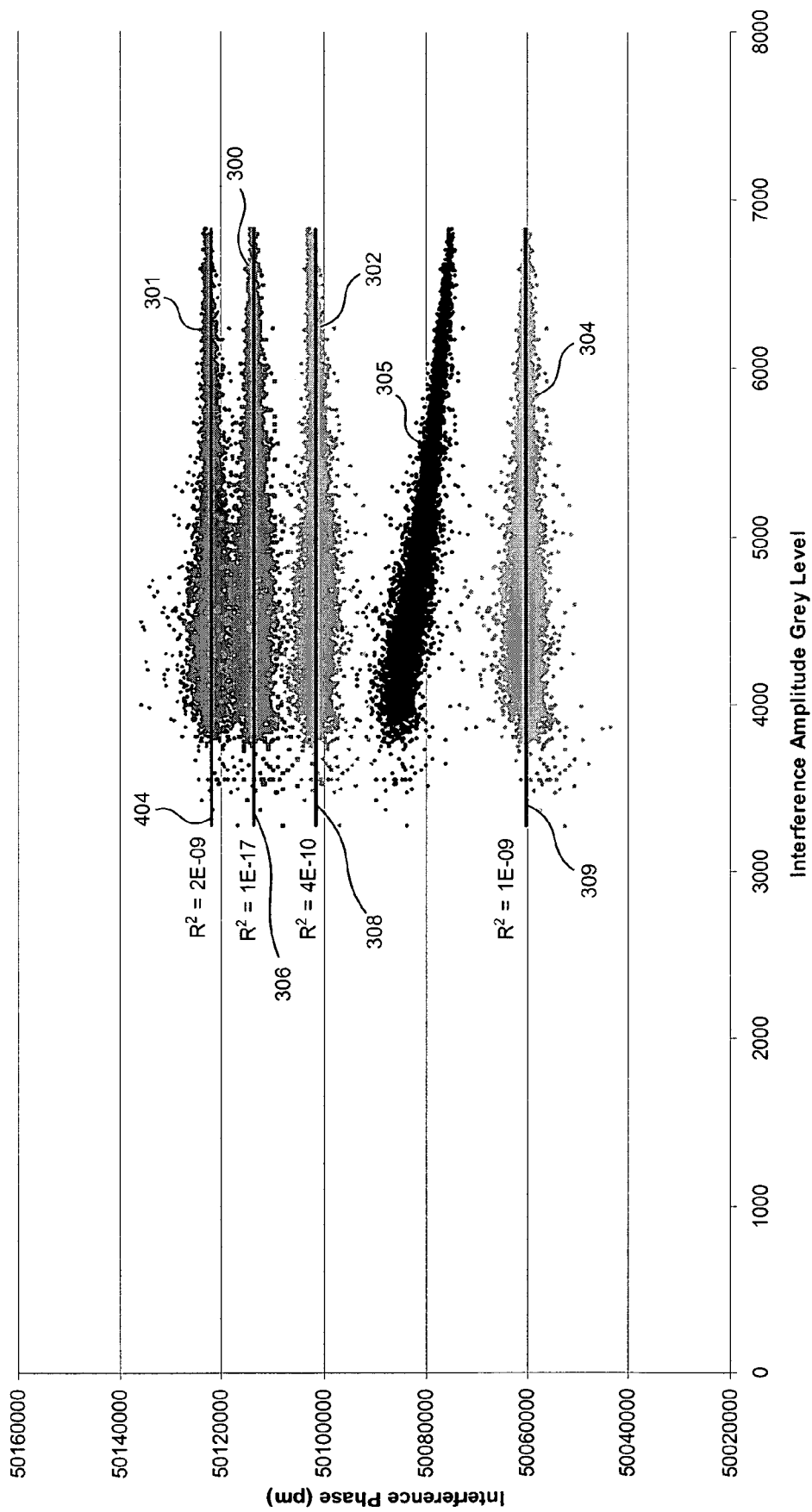
FIG. 11 shows the results obtained by correcting the data set shown in FIG. 9 using a number of different correction fitting functions (including a correction fitting function based on an inverse-amplitude model) to fit the form of the data set.

FIG. 11 is a plot of interference phase (as represented by the determined height data H) in nanometres against interference amplitude grey level illustrating the effect of correcting the measured data shown in FIG. 9 using four different correction fitting functions. Thus in FIG. 11: the data labelled 305 represent the uncorrected data obtained from measurement on an uncoated $Al_2O_3$—TiC sample surface; the data labelled 300 represent the corrected phase-reflectance function data obtained by removing the form of the data by fitting a quadratic correction function of the form $H'=H+\beta_1 r+\beta_2 r^2$ to the form of the data; the data labelled 301 represent the corrected phase-reflectance function data obtained by removing the form of the data by fitting a square root correction function of the form $H'=H+\beta_0 \sqrt{r}$ to the form of the data; the data labelled 302 represent the corrected phase-reflectance function data obtained by removing the form of the data by fitting a linear correction function of the form $H'=H+\beta_0 r$ to the form of the data; and the data labelled 304 represents the corrected phase-reflectance function data obtained by removing the form of the data determined by fitting an inverse linear correction function of the form $H'=H+\beta_0/r$, referred to herein as the "inverse amplitude" correction function, to the form of the data.

In this example, for the Talysurf CCI 3000, the actual inverse amplitude function used is:

$$H_{ij}' = H_{ij} + \frac{\beta_0 s N^2}{N_{ij}} = H_{ij} + \beta_0 s N \left( \frac{\overline{A_{Al_2O_3}}}{A_{ij}} \right) \quad 5)$$

where $H_{ij}$ is the height data determined by the coherence peak position determiner 201 for surface pixel $SP_{ij}$, N is, in this case, the amplitude data value in bits for the aluminium oxide overcoat A and is included to compensate for variations in lighting level so that the resulting modified height value is independent of variations in light level. $N_{ij}$ is an amplitude data value for the surface pixel $Sp_{ij}$ which may vary across the field of view due to variation in light level and is determined by fitting a low order polynomial or a spline function to amplitude data obtained by measurement of a planar AlTiC surface. The parameter s is required to make the equation dimensionally correct. In this example, N and $N_{ij}$ which are instrument specific are measured in bits while H is measured in picometres per bit so that s is 1 picometre per bit.

The solid lines 306, 307, 308 and 309 in FIG. 11 represent the best fit straight lines through the corrected data with effectively zero gradient. The values $R^2$ show the root mean square deviation. FIG. 11 shows that the correction obtained by using the "inverse amplitude" correction function provides good independence of the measured phase in terms of the amplitude.

In the present example, therefore, the "inverse amplitude" correction function is used as the correction function.

In order to enable the fitting and correction procedure to be carried out, a value for the correction parameter $\beta$ must of course be provided. The manner in which this value is determined in the present example will now be described with reference to FIG. 7 and to FIG. 12 which shows a flow chart of processes carried out by various functional components of the data processor 32 under the control of the data processor controller 200 and to FIG. 14 which shows a graph of the Root Mean Square (RMS) roughness Sq against values for the correction parameter β.

Figure 12:
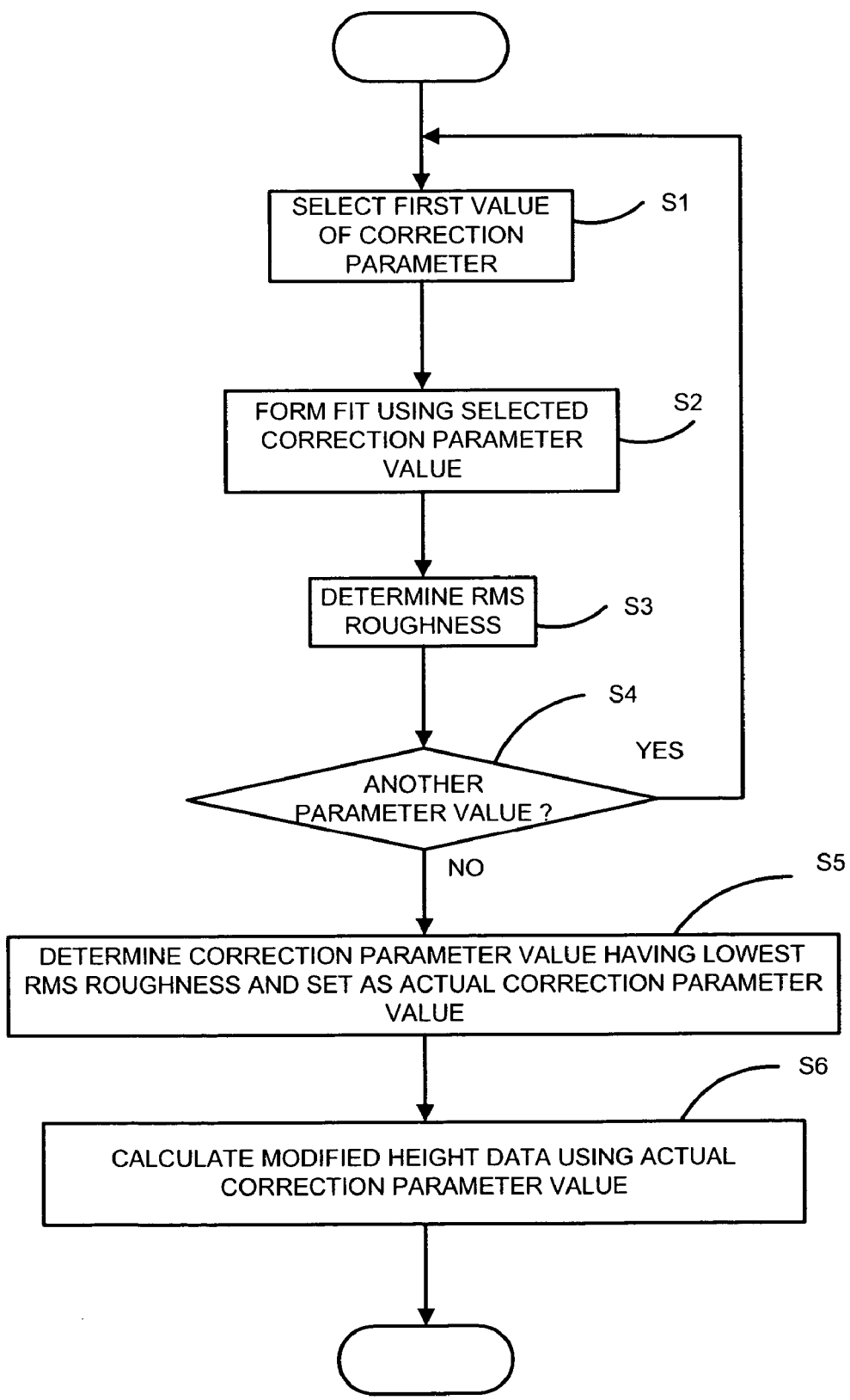
FIG. 12 shows a flow chart illustrating processes carried out by the data processor shown in FIG. 7.

At S1 in FIG. 12, the correction function fitter 203 selects a first one of a range of possible values for the parameter β and then at S2 carries out the forming fitting procedure described above using the "inverse amplitude" correction function of equation 5 to provide, for each surface pixel $SP_{ij}$, a modified height data value $H'_{ij}$.

Thus, a set of modified height data values is obtained for that value of β. Before the correction function fitter 203 carries out the process of S2, the data may be subject to a thresholding procedure that removes values having an amplitude below a first threshold (to remove the effect of dust) and that removes extremal values, such as data spikes, having a height above a second threshold.

Figure 13:
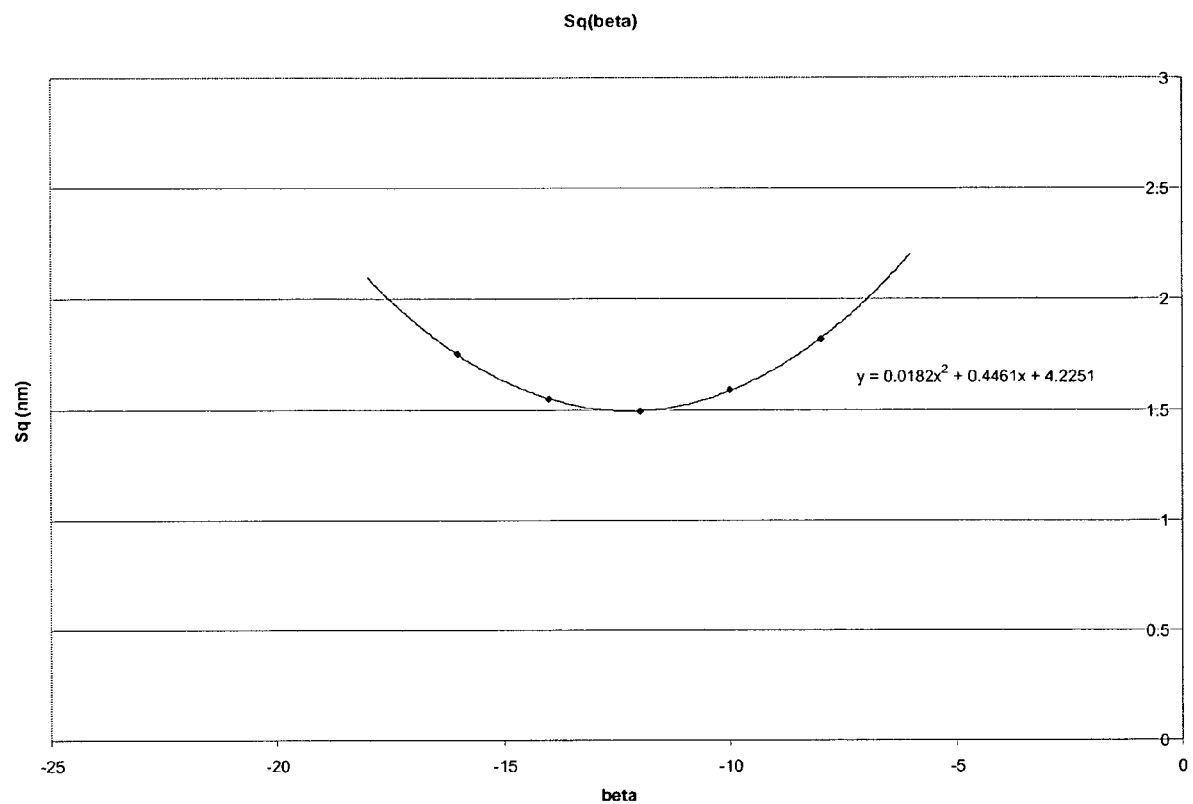
FIG. 13 shows a graph of the root mean square roughness Sq in nanometres as a function of a correction parameter beta ($\beta$) for illustrating one way of determining a value for the correction parameter of the correction fitting function.

The controller 200 then causes the RMS determiner 204 to determine and store the RMS roughness Sq of that set of modified height data values at S3, that is the RMS roughness Sq of the set of modified height data values $H'_{ij}$ produced using that value of the correction parameter β. The data processor controller 200 then checks at S4 whether the RMS roughness Sq has been determined for each β within the selected range and, if not, repeats S1 to S4 until the answer at S4 is yes. FIG. 13 shows a plot of the determined RMS roughness Sq in nm against beta (β).

The data processor controller 200 then causes the correction parameter selector 205 to determine at S5 the value $β_0$ of β for which the RMS roughness Sq is a minimum. In this example, this is determined by fitting a parabola to the data shown in FIG. 13 and determining the value of β for which the first derivative is zero. This value of β is then set as the correction parameter $β_0$.

Thus $β_o$, is determined by evaluating the RMS roughness Sq over the composite material surface (the $Al_2O_3$—TiC air bearing surface (sometimes known as the "reference region") R in the case of a read-write head slider) over a range of β values and setting as $β_o$ the value of β corresponding to the minimum RMS roughness Sq.

Once $β_o$ has been obtained, then the data processor controller 200 causes the modified height data calculator 207 to calculate, for each surface pixel $SP_{ij}$ phase-change-on-reflection compensated height data $H'_{ij}$ using the height data $H_{ij}$ determined by the coherence peak position determiner 201, the corresponding amplitude data $A_{ij}$ determined by the coherence peak amplitude determiner 202, fixed parameters stored in the fixed parameter store 220 and the determined correction parameter $β_0$ in accordance with:

$$H'_{ij} = H_{ij} + β_o sN\left(\frac{\overline{r_{Al_2O_3}}}{r_{ij}} - γ\right) \quad (6)$$

$$= H_{ij} + β_o sN\left(\frac{\overline{A_{Al_2O_3}}}{A_{ij}} - γ\right)$$

$$= H_{ij} + β_o sN\left(\frac{N}{N_{ij}} - γ\right)$$

where the heights $H'_{ij}$ and $H_{ij}$ are expressed in picometres per bit, s and N are fixed parameters stored in the fixed parameter store 220 (with, in this example as mentioned above, s being 1 picometre per bit and N being the average amplitude value in bits for $Al_2O_3$) and where the overbars indicate average values. The term γ is another fixed parameter stored in the fixed parameter store 220 and accounts for the fact that, in practice, the most extant grains or islands of $Al_2O_3$ within the $Al_2O_3$—TiC air bearing surface R exhibit an interference amplitude that is greater than that of the $Al_2O_3$ in the overcoat region A. This 'amplitude smearing' is interpreted as being primarily due to the convolution of the interference objective point-spread function. In practice, γ is assigned the value 1.2, although as will be discussed below in some circumstances it could be set to unity.

The average value over the numerical aperture of the interferometer system for the amplitude $\overline{A_{Al_2O_3}}$ is included in equation 5 in order to compensate for any variation in light level. This average value will generally be determined in advance from intensity data values produced by measurements made on the $Al_2O_3$ overcoat region A and stored by an averager 210 of the data processor 32. This light level compensation term need not necessarily be an average value for the amplitude for the overcoat region but could be an average amplitude value for any other suitable surface region that enables compensation for light level variation. As another possibility, the interferometer system may include a light level detector and the output of this light level detector may be used to provide a light level compensation term or to maintain the light level constant. The key factor is that the bracketed amplitude terms in equation 6 are independent of any light source variation.

The modified surface height data calculator 207 thus calculates, for each surface pixel $SP_{ij}$ the corrected height data $H'_{ij}$ in accordance with equation 5 above that is by dividing the average $Al_2O_3$ amplitude value obtained by the averager 210 by the actual $Al_2O_3$—TiC amplitude $A_{ij}$ for the particular surface pixel $SP_{ij}$ then subtracting the value of γ stored in the fixed parameter store 206 from the result and then multiplying the result by the selected correction parameter $β_0$ retrieved from the correction parameter selector 205 multiplied by the values of s and N stored in the fixed parameter store 206. This procedure is repeated for each surface pixel $SP_{ij}$.

Once the modified height data $H'_{ij}$ has been determined and height data values obtained for the $Al_2O_3$ overcoat A, the shield S1 and pole P1 using the apparatus shown in FIG. 1 in the manner described in WO03/078925, then the PTR and ALR determiners 211 and 212 can determine the PTR and ALR parameters in the normal manner discussed above but using the modified height data for the $Al_2O_3$—TiC air bearing surface R provided by the modified surface height data calculator 207.

FIGS. 14a, 14b and 14c show two-dimensional plots each representing a two-dimensional array of surface pixels of a 60 micrometre by 40 micrometre area of an aluminium oxide-titanium carbide surface. FIG. 14a represents the surface height or phase for each surface pixel while FIG. 14b represents the amplitude of the coherence peak for each surface pixel. FIG. 14c represents the surface height or phase for each surface pixel after compensation for phase-change-on-reflection using a method embodying the invention. Comparison of FIGS. 14b and c shows the change in roughness after compensation.

FIGS. 15a and 15b show perspective views of two-dimensional height or phase data plots for an aluminium overcoat A and the aluminium oxide-titanium carbide air bearing surface R of a read-write slider with FIG. 15a showing the data before and FIG. 15b showing the data after compensation for phase-change-on-reflection in the manner described above. In this case, both the change in roughness and a change in DC level with respect to the $Al_2O_3$ region A after compensation are apparent.

In the manufacture of hard disk drive read/write head sliders, it is standard practice to vacuum deposit a thin diamond-like-carbon (DLC) top-coating on top of a 'bonding' $SiO_2$ thin layer to increase wear-resistance. It is important to be able to measure the PTR and ALR parameters on such coated sliders. For the case of uncoated sliders, using standard matrix thin film theory (integrated over the numerical aperture (NA) of the interferometer system) together with published low-NA ellipsometric spectral n and k (the real and imaginary parts of the complex refractive index) for the $Al_2O_3$—TiC air bearing surface R yields a PCOR-induced error for ALR of approximately +8.7 nm. This compares favourably with a value of +9.7 nm obtained experimentally by measurements made using the interferometric system described above on an a slider vacuum-coated with chromium to remove the need to compensate for PCOR. However, for DLC coated sliders while the 'Dual Phasor' model provides a significantly better fit to the phase-reflectance function than standard matrix thin film theory (in conjunction with the known real and imaginary parts n and k of the complex optical admittance for $Al_2O_3$—TiC as measured with a low numerical aperture ellipsometer), the actual phase-reflectance function 'distortion' induced by the DLC thin film is far in excess of that predicted. The 'inverse amplitude' correction function described above however still provides a good fit to the experimental range of the phase-reflectance function. This is illustrated by FIGS. 16 to 18.

FIG. 16 shows a graph representing the phase (in nanometres) against electric field reflectance predicted by the theoretical phase-reflectance model (the "Dual Phasor" model) for: an uncoated aluminium oxide-titanium carbide surface (the line labelled 401); a first DLC coated aluminium oxide-titanium carbide surface (data labelled 402); and for a second DLC coated aluminium oxide-titanium carbide surface (data labelled 403). FIG. 16 also shows the results (data labelled 404) obtained using a method embodying the invention that fits the above correction fitting function based on the inverse-amplitude model to data for the uncoated aluminium oxide-titanium carbide surface where the determined value of $\beta_0$ was −8.3.

FIG. 17 shows a graph representing experimentally determined phase (in nanometres) against electric field reflectance (calculated as described above with reference to FIG. 9) results for an uncoated aluminium oxide-titanium carbide surface (data labelled 410) and two coated aluminium oxide-titanium carbide surfaces (coated samples A and B, data labelled 411 and 412 respectively). The lines 413 and 414 represent the phase-reflectance relationships for TiC and $Al_2O_3$, respectively.

FIG. 18 shows a graph representing the phase (in nanometres) against electric field reflectance predicted by the theoretical phase-reflectance model for an uncoated aluminium oxide-titanium carbide surface (data labelled 420) and the results obtained by using a method embodying the invention that fits the correction fitting function based on the inverse-amplitude model to the form of the experimentally obtained data shown in FIG. 17 using a correction parameter value $\beta_0=-11.5$ for the uncoated sample (data labelled 421), using a correction parameter value $\beta_0=-14$ for coated sample A (data labelled 422) and using a correction parameter value $\beta_0=-19$ for coated sample B (data labelled 423).

FIGS. 16 to 18 thus show that the actual phase-reflectance function 'distortion' induced by the DLC and $SiO_2$ thin films is far in excess of that predicted. This behaviour is interpreted as being primarily due to stress, presumably stress-induced birefringence (it is well known to the person skilled in the thin-film art that, in particular, DLC thin films are highly stressed). The 'inverse amplitude' correction function provides a good fit to the experimental range of the phase-reflectance function showing that, to a good approximation, compensation of thin film PCOR-induced stress is not reliant on a knowledge of the individual layer thicknesses and indices, but on the single parameter $\beta_0$ which may be interpreted as stress-related.

The above method provides a good approximation to compensation for the phase change on reflection induced error in determined ALR and PTR parameters. A more precise compensation may be effected by making additional corrections for both ALR and PTR as will now be explained. These corrections are simple functions of $\beta_0$, are based upon the measurement of a number of different processed sliders and represent the residual DC errors remaining after implementation of the above described "inverse amplitude" correction function. The PTR parameter may have a significant DC offset due to the significant optical admittance difference between the material forming the pole P1 and the $Al_2O_3$ of the air bearing surface R. For the ALR parameter, the DC offset will generally be very small, possibly zero or approaching zero.

In order to determine these DC corrections, PTR and ALR parameters for a total of 16 different batches (from several different manufacturers) of both DLC coated and uncoated sliders were determined by two methods: method (i) the 'inverse amplitude' correction function fitting method described above; and method (ii) using either an AFM or by scanning white light interferometry after vacuum coating with chromium (to present a uniform optical admittance as described above). For all these sliders, the error 'true-apparent' (that is the difference between the result determined using method (ii) and the result determined using method (i)) for both PTR and ALR were determined.

FIG. 19 shows a graph of this error in nanometres (nm) in the determined ALR parameter against the correction parameter value $\beta_0$ while FIG. 20 shows a graph of error in nanometres (nm) in the determined PTR parameter against the correction parameter value $P_0$ for these 16 different batches of sliders. FIGS. 19 and 20 show that for DLC coated sliders there are linear relationships between $\beta_0$ and both the ALR and the PTR errors. For the ALR errors in particular, the coated and uncoated sliders fall into two populations whereas for the ALR errors, this population separation is more marginal. From a thin-film point of view, there is no reason to expect the observed higher scattering associated with the ALR compared to PTR measurement; this increased scatter is understood as being largely due to the fact that the $Al_2O_3$ is further from the $Al_2O_3$—TiC than the magnetic material associated with PTR. Linear regression has been applied to the coated populations for both the ALR and PTR errors. The same gradients have been applied to the linear fits associated with the uncoated populations for both ALR and PTR. This deserves some explanation. Introducing noise in to the measurement path causes a 'phase jitter'; this in turn causes (i) a change in the apparent ALR and PTR values and (ii) a change in $\beta_0$. The magnitudes of the resulting $d(ALR)/d\beta_0$ and $d(PTR)/d\beta_0$ 'drift' gradients are, within the measurement noise uncertainty, identical (but of opposite sign) to the linear regression gradients.

These linear relationships for the residual errors for ALR and PTR for DLC coated and uncoated sliders may be usefully expressed in terms of 'departure from a local $\beta_0$':

| | |
|---|---|
| Coated ALR: | $\Delta ALR = 1.97 − 0.6175(\beta_0 + 15)$ |
| Uncoated ALR: | $\Delta ALR = 1.92 − 0.6175(\beta_0 + 10)$ |
| Coated PTR: | $\Delta PTR = 29.89 − 1.1134(\beta_0 + 15)$ |
| Uncoated PTR: | $\Delta PTR = 24.00 − 1.1134(\beta_0 + 10)$ |

These experimentally determined linear correction terms are stored in a linear term correction store 213 of the data processor 32 and the PTR and ALR determiners 211 and 212 correct the ALR and PTR parameter values obtained by using the 'inverse amplitude' correction function corrected height data $H'_{ij}$ for the composite $Al_2O_3$—TiC air bearing R. The ALR and PTR parameter determiners determine the required linear correction term from data input by the user using the user interface that indicates whether the sample is an uncoated or a DLC coated sample.

As described above, the term γ in equation 5 has a value of 1.2. This term γ may be set to unity but this would mean that the above DC corrections would be larger.

The functional dependency of $\beta_o$ is emphasised by its explicitly inclusion. Thus:

$$ALR_{corrected} = ALR(\beta_o) + \Delta ALR(\beta_o)$$

$$PTR_{corrected} = PTR(\beta_o) + \Delta PTR(\beta_o)$$

FIG. 21 shows a graph of the mean error in nanometres (nm) in the determined ALR parameter against correction parameter value $\beta_0$ illustrating the $d(ALR)/d\beta_o$ drift gradients for various different sliders, both DLC coated and uncoated while FIG. 22 shows a graph of the mean error in nanometres (nm) in the determined PTR parameter against correction parameter value $\beta_0$, illustrating the $d(PTR)/d\beta_o$ drift gradients for various different sliders, both DLC coated and uncoated. The essential identity (apart from the opposite polarity) of these drift gradients with the corresponding linear regression gradients means that, as another possibility, a fixed $\beta_o$ value (designated $\beta_{ref}$) may be used in the initial 'inverse amplitude' correction function, with the effective identity of these two gradient pairs resulting in self-compensation. Suitable such fixed $\beta_{ref}$ values are −15 and −10 for DLC coated and uncoated sliders, respectively. Using this approach then requires the same form of ΔALR and ΔPTR residual error correction, these corrections again being functions of $\beta_o$. Of the two approaches, this fixed $\beta_o$ approach is marginally the less favoured because of its reliance on the above-mentioned gradient pair magnitude identity, together with poor AC correction of the $Al_2O_3$—TiC surface roughness.

Although the above method uses the "inverse amplitude" correction function, another simple power correction function may be used, for example the linear or square root correction function described with reference to FIG. 11. Also, methods other than those described in WO03/078925 may be used to determine the surface height data. As described above, the correction parameter value $\beta_0$ may be determined by determining modified surface height data for a number of different β values using equation 5 and then selecting for use in equation 6 the value of β for which the root mean square roughness Sq is a minimum. As another possibility, equation 6 may be evaluated for a number of different β values, the root mean square roughness Sq calculated for each set of height values and then results providing the lowest root mean square selected as the actual modified height data $H'_{ij}$. In this case calculation equation 5 is not required and equation 6 represents the correction function provided by the "inverse amplitude" model.

Other indicators of the roughness of the height data $H_{ij}$ than Sq may be used A method and apparatus embodying the invention may also be applied to composite materials other than aluminium oxide-titanium carbide. As described above, the interferometric system is a Scanning White Light Interferometry (SWLI) System, the present invention may however also be applied to a phase Shifting Interferometry (PSI) system.

As described above, the interferometric system uses a visible light source. It may however be possible or appropriate to use an infra red or ultra violet light source, provided the materials of the sample being measured are sufficiently reflective at the wavelength(s) concerned.

The apparatus described above may form part of a component manufacturing system in which the modified surface height data is used to determine a parameter (or characteristic) of a manufactured component, for example the ALR and PTR parameters in the case of in the case of a rigid disk drive, and in which the determined parameter(s) (or an average or other indicator representing the determined parameter(s) for a number of manufactured components) is(are) used to provide control information for at least one of a component designing apparatus and a component manufacturing apparatus to enable the designing and/or manufacturing process to be modified in accordance with the determined parameter(s). Where a component designing apparatus is provided then the component manufacturing apparatus may be controlled in accordance with results provided by the component designing apparatus.

We claim:

1. Apparatus for determining a surface characteristic of a composite material sample surface, the apparatus comprising an interferometer system having:
    a light director to direct light along a sample path towards a sample surface and along a reference path towards a reference surface such that light reflected by the sample surface and light reflected by the reference surface interfere;
    a mover operable to effect relative movement along a measurement scan path between the sample and the reference surface;
    a sensing device having an array of sensing elements each operable to sense light representing the interference fringes produced by a corresponding surface region of the sample surface; and
    a controller operable to carry out a measurement operation by causing the mover to effect relative movement while the sensing device senses light intensity at intervals to provide, for each surface region, a set of intensity data representing interference fringes produced by that surface region; and
the apparatus also comprising a data processor providing:
    a position determiner to determine from the set of intensity data obtained for a surface region of the sample surface surface height data representing a position on the measurement scan path that corresponds to the height of that surface region of the sample surface;
    an amplitude determiner to determine for a surface region of the sample surface amplitude data representing the amplitude of the set of intensity data obtained for that sample region of the sample surface at the position determined by the position determiner to represent the height of the surface region;
    a correction parameter provider to provide a correction parameter; and
    a modified surface height calculator to calculate modified surface height data for a surface region of the sample surface by modifying the surface height data determined by the position determiner for that surface region by a correction factor determined using the corresponding amplitude data determined for that surface region and the correction parameter provided by the correction parameter provider.

2. Apparatus according to claim 1, wherein: the controller is operable to carry out a measurement operation by causing the mover to effect relative movement while the sensing device senses light intensity at intervals to provide, for each surface region, a series of intensity values representing interference fringes produced by a region of a sample surface during the relative movement such that the series of intensity values include a coherence peak at the position along the scan path; the position determiner is operable to determine, as the position representing the height of the surface region the position along the scan path at which the coherence peak occurs; and the amplitude determiner is operable to determine, as the amplitude data for a surface region, amplitude data representing the amplitude of the coherence peak.

3. Apparatus according to claim 1, wherein the interferometer system comprises a phase shifting interferometer.

4. Apparatus according to claim 1, wherein the interferometer system comprises a scanning white light or coherence scanning interferometer.

5. Apparatus according to claim 1, wherein the correction parameter provider comprises: a correction function fitter operable to fit the form of a data set representing the relationship between the height and corresponding amplitude data determined by the position and amplitude determiners with a correction function that uses the correction parameter to relate height and amplitude, the correction function fitter being operable to fit the correction function using a number of different values for the correction parameter, and wherein the correction parameter provider also comprises a correction parameter value selector operable to select as the correction parameter to be used by the modified surface height calculator the correction parameter value for which the correction function provides the best fit to the form of the data set.

6. Apparatus according to claim 5, wherein the correction parameter provider comprises a roughness determiner for determining a measure representing the surface roughness for surface height data corrected using each value of the correction parameter and the correction parameter value selector is operable to select as the correction parameter the correction parameter value for which the roughness measure is a minimum.

7. Apparatus according to claim 6, wherein the roughness measure is the root mean square roughness.

8. Apparatus according to claim 1, wherein the modified surface height calculator is operable to fit the form of a data set representing the relationship between the height and corresponding amplitude data determined by the position and amplitude determiners with a correction function that uses the correction parameter to relate surface height and amplitude, the modified surface height calculator being operable to use different values of the correction parameter to produce corresponding different sets of modified surface height data and to select the one of the sets of modified surface height data that meets a given criterion.

9. Apparatus according to claim 8, wherein the modified surface height calculator is operable to use a roughness determiner for determining a measure representing the surface roughness for each set of modified surface height data and the given criterion is the minimum roughness measure.

10. Apparatus according to claim 9, wherein the roughness measure is the root mean square roughness.

11. Apparatus according to claim 5, wherein the correction function inversely relates the amplitude to the height data.

12. Apparatus for determining a surface characteristic of a composite material sample surface, the apparatus comprising an interferometer system having:
a light director operable to direct light along a sample path towards a sample surface and along a reference path towards a reference surface such that light reflected by the sample surface and light reflected by the reference surface interfere;
a mover operable to effect relative movement along a measurement scan path between the sample and the reference surface;
a sensing device having an array of sensing elements each operable to sense light representing the interference fringes produced by a corresponding surface region of the sample surface; and
a controller operable to carry out a measurement operation by causing the mover to effect relative movement while the sensing device senses light intensity at intervals to provide, for each surface region, a set of intensity data representing interference fringes produced by that surface region; and the apparatus also comprising a data processor providing:
a position determiner operable to determine from the set of intensity data for a surface region surface height data representing a position on the measurement scan path that corresponds to the height of the surface region;
an amplitude determiner operable to determine for a surface region amplitude data representing the amplitude of the intensity data at the position determined by the position determiner to represent the height of the surface region;
a correction parameter provider operable to provide a correction parameter; and
a modified surface height calculator operable to calculate modified surface height data for a surface region by modifying the surface height data determined by the position determiner by a correction factor determined using the corresponding amplitude data and the correction parameter provided by the correction parameter provider, wherein the correction parameter provider comprises: a correction function fitter operable to fit the form of a data set representing a relationship between the height and corresponding amplitude data determined by the position and amplitude determiners with a correction function that uses the correction parameter to relate height and amplitude, the correction function fitter being operable to fit the correction function using a number of different values for the correction parameter, and wherein the correction parameter provider also comprises a correction parameter value selector operable to select as the correction parameter to be used by the modified surface height calculator the correction parameter value for which the correction function provides the best fit to the form of the data set, and wherein the correction function is H'ij =Hij +aβ/Aij where Hij is the determined height data for the surface region Sij, Aij is the determined amplitude data, β is the correction parameter and a is an adjustment factor.

13. Apparatus for determining a surface characteristic of a composite material sample surface, the apparatus comprising an interferometer system having:
a light director operable to direct light along a sample path towards a sample surface and along a reference path towards a reference surface such that light reflected by the sample surface and light reflected by the reference surface interfere;
a mover operable to effect relative movement along a measurement scan path between the sample and the reference surface;
a sensing device having an array of sensing elements each operable to sense light representing the interference fringes produced by a corresponding surface region of the sample surface; and
a controller operable to carry out a measurement operation by causing the mover to effect relative movement while the sensing device senses light intensity at intervals to provide, for each surface region, a set of intensity data representing interference fringes produced by that surface region; and the apparatus also comprising a data processor providing:

a position determiner operable to determine from the set of intensity data for a surface region surface height data representing a position on the measurement scan path that corresponds to the height of the surface region;

an amplitude determiner operable to determine for a surface region amplitude data representing the amplitude of the intensity data at the position determined by the position determiner to represent the height of the surface region;

a correction parameter provider operable to provide a correction parameter; and a modified surface height calculator operable to calculate modified surface height data for a surface region by modifying the surface height data determined by the position determiner by a correction factor determined using the corresponding amplitude data and the correction parameter provided by the correction parameter provider, wherein the correction parameter provider comprises: a correction function fitter operable to fit the form of a data set representing a relationship between the height and corresponding amplitude data determined by the position and amplitude determiners with a correction function that uses the correction parameter to relate height and amplitude, the correction function fitter being operable to fit the correction function using a number of different values for the correction parameter, and wherein the correction parameter provider also comprises a correction parameter value selector operable to select as the correction parameter to be used by the modified surface height calculator the correction parameter value for which the correction function provides the best fit to the form of the data set, and wherein the correction function is $$H'_{ij} = H_{ij} + \frac{\beta s N^2}{N_{ij}}$$

where Hij is the determined height of the surface region Sij, Nij represents the determined amplitude data, s and N are adjustment factors, and $\beta$ is the correction parameter.

14. Apparatus for determining a surface characteristic of a composite material sample surface, the apparatus comprising an interferometer system having:

a light director operable to direct light along a sample path towards a sample surface and along a reference path towards a reference surface such that light reflected by the sample surface and light reflected by the reference surface interfere;

a mover operable to effect relative movement along a measurement scan path between the sample and the reference surface;

a sensing device having an array of sensing elements each operable to sense light representing the interference fringes produced by a corresponding surface region of the sample surface; and a controller operable to carry out a measurement operation by causing the mover to effect relative movement while the sensing device senses light intensity at intervals to provide, for each surface region, a set of intensity data representing interference fringes produced by that surface region; and the apparatus also comprising a data processor providing:

a position determiner operable to determine from the set of intensity data for a surface region surface height data representing a position on the measurement scan path that corresponds to the height of the surface region;

an amplitude determiner operable to determine for a surface region amplitude data representing the amplitude of the intensity data at the position determined by the position determiner to represent the height of the surface region;

a correction parameter provider operable to provide a correction parameter; and a modified surface height calculator operable to calculate modified surface height data for a surface region by modifying the surface height data determined by the position determiner by a correction factor determined using the corresponding amplitude data and the correction parameter provided by the correction parameter provider, wherein the correction parameter is predetermined.

15. Apparatus for determining a surface characteristic of a composite material sample surface, the apparatus comprising an interferometer system having:

a light director operable to direct light along a sample path towards a sample surface and along a reference path towards a reference surface such that light reflected by the sample surface and light reflected by the reference surface interfere;

a mover operable to effect relative movement along a measurement scan path between the sample and the reference surface;

a sensing device having an array of sensing elements each operable to sense light representing the interference fringes produced by a corresponding surface region of the sample surface; and a controller operable to carry out a measurement operation by causing the mover to effect relative movement while the sensing device senses light intensity at intervals to provide, for each surface region, a set of intensity data representing interference fringes produced by that surface region; and the apparatus also comprising a data processor providing:

a position determiner operable to determine from the set of intensity data for a surface region surface height data representing a position on the measurement scan path that corresponds to the height of the surface region;

an amplitude determiner operable to determine for a surface region amplitude data representing the amplitude of the intensity data at the position determined by the position determiner to represent the height of the surface region;

a correction parameter provider operable to provide a correction parameter; and a modified surface height calculator operable to calculate modified surface height data for a surface region by modifying the surface height data determined by the position determiner by a correction factor determined using the corresponding amplitude data and the correction parameter provided by the correction parameter provider, wherein the modified surface height calculator is operable to calculate modified surface height data H'ij=Hij+b$\beta$/Aij where Hij is the determined surface height data for the surface region Sij, Aij is the determined amplitude data, β is the correction parameter and b is an adjustment factor.

16. Apparatus for determining a surface characteristic of a composite material sample surface, the apparatus comprising an interferometer system having:
a light director operable to direct light along a sample path towards a sample surface and along a reference path towards a reference surface such that light reflected by the sample surface and light reflected by the reference surface interfere;
a mover operable to effect relative movement along a measurement scan path between the sample and the reference surface;
a sensing device having an array of sensing elements each operable to sense light representing the interference fringes produced by a corresponding surface region of the sample surface; and
a controller operable to carry out a measurement operation by causing the mover to effect relative movement while the sensing device senses light intensity at intervals to provide, for each surface region, a set of intensity data representing interference fringes produced by that surface region; and
the apparatus also comprising a data processor providing:
a position determiner operable to determine from the set of intensity data for a surface region surface height data representing a position on the measurement scan path that corresponds to the height of the surface region;
an amplitude determiner operable to determine for a surface region amplitude data representing the amplitude of the intensity data at the position determined by the position determiner to represent the height of the surface region;
a correction parameter provider operable to provide a correction parameter; and
a modified surface height calculator operable to calculate modified surface height data for a surface region by modifying the surface height data determined by the position determiner by a correction factor determined using the corresponding amplitude data and the correction parameter provided by the correction parameter provider, wherein the modified surface height calculator is operable to calculate modified surface height data:

$$H'_{ij} = H_{ij} + \beta sN\left(\frac{\overline{r_{Al_2O_3}}}{r_{ij}} - \gamma\right)$$
$$= H_{ij} + \beta sN\left(\frac{\overline{A_{Al_2O_3}}}{A_{ij}} - \gamma\right)$$
$$= H_{ij} + \beta sN\left(\frac{N}{N_{ij}} - \gamma\right)$$

where Hij is the determined height data for the surface region Sij, Aij and Nij represent the determined amplitude, β is the correction parameter and s, N and y are adjustment factors, $r_{ij}$ is electric field reflectance at surface region Sij, $\overline{A_{Al_2O_3}}$ is the average amplitude of an
aluminum oxide region and $\overline{r_{Al_2O_3}}$ is the average electric field reflectance of the aluminum oxide region.

17. Apparatus according to claim 1, further comprising an aluminum oxide trailing edge recession parameter determiner operable to use modified surface height data calculated by the modified surface height calculator for a composite material air surface of a magnetic read-write head slider in determining an aluminum oxide trailing edge recession parameter of the magnetic read-write head slider.

18. Apparatus according to claim 1, further comprising a pole tip recession parameter determiner operable to use modified surface height data calculated by the modified surface height calculator for a composite material air bearing surface of a magnetic read-write head slider in determining a pole tip recession parameter of the magnetic read-write head slider.

19. Apparatus according to claim 17, wherein the parameter determiner is operable to adjust the parameter in accordance with an adjustment parameter, ΔALR; ΔPTR, which is a function of the correction function parameter.

20. Data processing apparatus for use in apparatus in accordance with claim 1, comprising:
an intensity data value receiver to receive a set of interferometric intensity data for a surface region;
a position determiner to determine from the set of intensity data obtained for a surface region of the sample surface surface height data representing a position on the measurement scan path that corresponds to the height of that surface region of the sample surface;
an amplitude determiner to determine for a surface region of the sample surface amplitude data representing the amplitude of the set of intensity data obtained for that sample region of the surface surface at the position determined by the position determiner to represent the height of the surface region;
a correction parameter provider to provide a correction parameter; and
a modified surface height calculator to calculate modified surface height data for a surface region of the sample surface by modifying the surface height data determined by the position determiner for that surface region by a correction factor determined using the corresponding amplitude data determined for that surface region and the correction parameter provided by the correction parameter provider.

21. Data processing apparatus for use in apparatus in accordance with claim 1, comprising:
a data receiver to receive surface height data representing the position along on the measurement path that corresponds to the height of the a surface region of a sample surface and also to receive, in addition to the surface height data, amplitude data representing the amplitude of the intensity data obtained for the same surface region of the sample surface at the position determined to represent the height of that surface region;
a correction parameter provider to provide a correction parameter; and
a modified surface height calculator to calculate modified surface height data for a surface region of the sample surface by modifying the surface height data determined by the position determiner for that surface region by a correction factor determined using the corresponding amplitude data for that surface region and the correction parameter provided by the correction parameter provider.

22. Apparatus for determining a surface characteristic of a composite material sample surface, the apparatus comprising an interferometer system having:
light directing means for directing light along a sample path towards a sample surface and along a reference path towards a reference surface such that light reflected by the sample surface and light reflected by the reference surface interfere;

moving means for effecting relative movement along a measurement scan path between the sample and the reference surface;

sensing means having an array of sensing elements each for sensing light representing the interference fringes produced by a corresponding surface region of the sample surface;

control means for controlling the carrying out of a measurement operation by causing the moving means to effect relative movement while the sensing means senses light intensity at intervals to provide, for each surface region, a set of intensity data representing interference fringes produced by that surface region;

position determining means for determining from the set of intensity data obtained for a surface region of the sample surface surface height data representing a position on the measurement scan path that corresponds to the height of that surface region of the sample surface;

amplitude determining means for determining for a surface region of the sample surface amplitude data representing the amplitude of the intensity data obtained for that surface region of the sample surface at the position determined by the position determining means to represent the height of the surface region;

correction parameter providing means for providing a correction parameter; and modified surface height calculating means for calculating modified surface height data for a surface region of the sample surface by modifying the surface height data determined by the position determining means for that surface region by a correction factor determined using the corresponding amplitude data for that surface region and the correction parameter provided by the correction parameter providing means.

* * * * *

UNITED STATES PATENT AND TRADEMARK OFFICE
CERTIFICATE OF CORRECTION

PATENT NO. : 7,697,726 B2 Page 1 of 1
APPLICATION NO. : 11/260072
DATED : April 13, 2010
INVENTOR(S) : Daniel Ian Mansfield and Andrew Douglas Bankhead It is certified that error appears in the above-identified patent and that said Letters Patent is hereby corrected as shown below:

Column 23, line 58 "y" should be -- $\gamma$ --

Signed and Sealed this

Fifteenth Day of June, 2010

David J. Kappos
*Director of the United States Patent and Trademark Office*